(12) United States Patent
Leonard et al.

(10) Patent No.: US 11,727,484 B2
(45) Date of Patent: *Aug. 15, 2023

(54) METHODS AND APPARATUS FOR MORTGAGE LOAN SECURITIZATION BASED UPON MORTGAGE SERVICING STORED ON BLOCKCHAIN

(71) Applicant: Ranieri IP, LLC, New York, NY (US)

(72) Inventors: Shane Michael Leonard, St Johns, FL (US); Richard Sheridan Collins, New York, NY (US)

( * ) Notice: Subject to any disclaimer, the term of this patent is extended or adjusted under 35 U.S.C. 154(b) by 43 days.

This patent is subject to a terminal disclaimer.

(21) Appl. No.: 17/493,001

(22) Filed: Oct. 4, 2021

(65) Prior Publication Data

US 2022/0027988 A1    Jan. 27, 2022

Related U.S. Application Data

(63) Continuation of application No. 17/117,929, filed on Dec. 10, 2020, now Pat. No. 11,138,658, which is a
(Continued)

(51) Int. Cl.
| | |
|---|---|
| *G06Q 40/03* | (2023.01) |
| *G06Q 20/38* | (2012.01) |
| *H04L 9/06* | (2006.01) |
| *H04L 9/08* | (2006.01) |
| *G06Q 20/10* | (2012.01) |

(Continued)

(52) U.S. Cl.
CPC .......... *G06Q 40/03* (2023.01); *G06Q 20/108* (2013.01); *G06Q 20/389* (2013.01); *G06Q 20/38215* (2013.01); *G06Q 20/405* (2013.01); *H04L 9/0637* (2013.01); *H04L 9/088* (2013.01);
(Continued)

(58) Field of Classification Search
None
See application file for complete search history.

(56) References Cited

U.S. PATENT DOCUMENTS

| | | | |
|---|---|---|---|
| 10,356,094 B2 | 7/2019 | Anton et al. | |
| 11,074,648 B1 * | 7/2021 | Duccini | ................ H04L 9/3247 |

(Continued)

FOREIGN PATENT DOCUMENTS

| | | | | | |
|---|---|---|---|---|---|
| WO | 2010003192 A1 | | 1/2010 | | |
| WO | WO-2010003192 A1 | * | 1/2010 | ........ | G06F 17/30011 |

OTHER PUBLICATIONS

Stellnberger, "Document Certification Through the Blockchain", www.martinstellnberger.co, Dec. 5, 2016. (Year: 2016).*

(Continued)

*Primary Examiner* — Abdulmajeed Aziz
(74) *Attorney, Agent, or Firm* — Trace H. Jackson; Rogers Towers PA

(57) ABSTRACT

Apparatus and methods for creation of securities based upon servicing records verified via a blockchain distributed ledger. The Blockchain is distributed to Participants in the Loan, such as the Borrowers, Regulators, Servicers, and Vendors. Participants may submit an aggregation criteria, such as for example a criteria used for selecting loans to be included in a securitization pool. The present disclosure further provides a method for homogenizing a variety of loan criteria and memorializing execution of a smart contract on the Blockchain.

20 Claims, 17 Drawing Sheets

Related U.S. Application Data continuation-in-part of application No. 16/706,238, filed on Dec. 6, 2019, now Pat. No. 11,244,391, which is a continuation of application No. 16/548,218, filed on Aug. 22, 2019, now Pat. No. 10,565,644, which is a continuation of application No. 16/290,920, filed on Mar. 3, 2019, now Pat. No. 10,482,533.

(60) Provisional application No. 62/946,225, filed on Dec. 10, 2019, provisional application No. 62/637,693, filed on Mar. 2, 2018.

(51) Int. Cl.
*G06Q 20/40* (2012.01)
*H04L 9/32* (2006.01)
*H04L 9/00* (2022.01)

(52) U.S. Cl.
CPC ....... *G06Q 20/401* (2013.01); *G06Q 2220/00* (2013.01); *H04L 9/3239* (2013.01); *H04L 9/50* (2022.05)

(56) References Cited

U.S. PATENT DOCUMENTS

| | | | |
|---|---|---|---|
| 11,334,560 B2* | 5/2022 | Yan | H04L 9/3239 |
| 2009/0089206 A1 | 4/2009 | Lukac | |
| 2016/0070449 A1 | 3/2016 | Christiansen et al. | |
| 2017/0011460 A1* | 1/2017 | Molinari | G06Q 40/06 |
| 2017/0046651 A1 | 2/2017 | Lin et al. | |
| 2017/0046799 A1 | 2/2017 | Chan et al. | |
| 2017/0046806 A1 | 2/2017 | Haldenby et al. | |
| 2017/0232300 A1 | 8/2017 | Tran et al. | |
| 2017/0329996 A1* | 11/2017 | Wilson | G06F 21/64 |
| 2017/0331810 A1* | 11/2017 | Kurian | H04L 63/108 |
| 2018/0075421 A1 | 3/2018 | Serrano et al. | |
| 2018/0204213 A1* | 7/2018 | Zappier | H04L 63/065 |
| 2018/0218176 A1* | 8/2018 | Voorhees | G06Q 20/02 |
| 2018/0253451 A1 | 9/2018 | Callan et al. | |
| 2018/0268504 A1 | 9/2018 | Paolini-Subramanya et al. | |
| 2018/0285970 A1* | 10/2018 | Snow | H04L 9/3247 |
| 2018/0343110 A1 | 11/2018 | Funk | |
| 2019/0057226 A1 | 2/2019 | Arbutina | |
| 2019/0087893 A1* | 3/2019 | Pellew | G06Q 20/102 |
| 2019/0123889 A1 | 4/2019 | Schmidt-Karaca | |
| 2019/0130416 A1 | 5/2019 | Boudville et al. | |
| 2019/0220831 A1 | 7/2019 | Rangarajan et al. | |
| 2019/0251573 A1 | 8/2019 | Toyota et al. | |

OTHER PUBLICATIONS

Blockchain Experts, "Document Verification Using Blockchain", Nov. 2018 (Year: 2018).

Deloitte. Blockchain in commercial real estate is here! Deloitte center for financial services. 2017 (year:2017).

Gaffney, "The Peer-to-Peer Blockchain Mortgage Recording System: Scraping the mortgage electronic registration system and replacing it with a system built off of a blockchain", Wake Forest Journal of Business and IP Law, vol. 17 #3, Spring 2017. (Year: 2017).

H. Magrahi, N. Omrane, O. Senotand R. Jaziri, "NFB: a Protocol for Notarizing Files over the Blockchain," 2018 9th IFIP International Conference on New Technologies, Mobility and Security (NTMS), Feb. 2018, pp. 1-4, doi: 10.1109/NTMS .2018.8328740. (Year: 2018).

Stellnberger, "Document Certification through the Blockchain", www.martinstellnberger.com, Dec. 5, 2016. (Year:2016).

* cited by examiner

```
┌─────────────────────────────────────────────────────────────────┐
│   PLACE THE ARTIFACT ASSOCIATED WITH THE POST BLOCKCHAIN MORTGAGE│
│        LOAN SERVICING EVENT IN AN OFF-BLOCKCHAIN STORAGE         │
│   907                                                            │
└─────────────────────────────────────────────────────────────────┘
                                 │
┌─────────────────────────────────────────────────────────────────┐
│      ASSOCIATE THE ARTIFACT ASSOCIATED WITH THE POST BLOCKCHAIN  │
│   MORTGAGE LOAN SERVICING EVENT STORED IN THE OFF-BLOCKCHAIN     │
│        STORAGE WITH ONE OR MORE PARTICULAR LEDGER ENTRIES        │
│   908                                                            │
└─────────────────────────────────────────────────────────────────┘
                                 │
┌─────────────────────────────────────────────────────────────────┐
│   TRANSMIT CONTENT OF A LEDGER ENTRY COMPRISING THE BLOCK WITH AN│
│    ARTIFACT MEMORIALIZING THE POST BLOCKCHAIN MORTGAGE SERVICING │
│    EVENT TO A PARTICIPANT BASED UPON A LOGICAL PROCESS ACCESSING │
│   METADATA AND A UNIQUE IDENTIFIER AND THE PARTICIPANT'S CREDENTIALS│
│   909                                                            │
└─────────────────────────────────────────────────────────────────┘
                                 │
┌─────────────────────────────────────────────────────────────────┐
│   TRANSMIT THE ARTIFACT ASSOCIATED WITH THE POST BLOCKCHAIN      │
│   MORTGAGE LOAN SERVICING EVENT AND STORED IN THE OFF-BLOCKCHAIN │
│        STORAGE TO THE PARTICIPANT BASED UPON LOGICAL PROCESSES   │
│   910  ACCESSING THE UNIQUE ID AND THE PARTICIPANT'S CREDENTIALS │
└─────────────────────────────────────────────────────────────────┘
                                 │
┌─────────────────────────────────────────────────────────────────┐
│    GENERATE A LOG RECORDING ACCESS TO ONE OR BOTH OF THE BLOCKCHAIN│
│                     AND THE OFF-BLOCKCHAIN STORAGE               │
│   911                                                            │
└─────────────────────────────────────────────────────────────────┘
                                 │
┌─────────────────────────────────────────────────────────────────┐
│   RECONCILE LEDGER ENTRIES APPENDED TO MULTIPLE BLOCKCHAIN NODES │
│                        VIA CONSENSUS MECHANISM                   │
│   912                                                            │
└─────────────────────────────────────────────────────────────────┘
```

FIG. 9B

```
┌─────────────────────────────────────────────────────────────────────┐
│ UNDERWRITING - LENDER DETERMINES FINAL RATE AND AMOUNT OF POTENTIAL │
│                 LOAN ALONG WITH AND POINTS/DISCOUNTS                │
│ 1007                                                                │
└─────────────────────────────────────────────────────────────────────┘
                                   │
┌─────────────────────────────────────────────────────────────────────┐
│ ACCEPTANCE OF TERMS - BORROWER REVIEWS LENDERS OFFER, AND 1.)       │
│        ACCEPTS OR 2.) COUNTERS OR 3.) LENDING REQUEST ENDS          │
│ 1008                                                                │
└─────────────────────────────────────────────────────────────────────┘
                                   │
┌─────────────────────────────────────────────────────────────────────┐
│   ACCEPTANCE OF TERMS – FINAL ACCEPTANCE OCCURS, OR LENDING         │
│                          REQUESTS ENDS                              │
│ 1009                                                                │
└─────────────────────────────────────────────────────────────────────┘
                                   │
┌─────────────────────────────────────────────────────────────────────┐
│  CLOSING/FUNDING:PREPARE LOAN DOCS (ADHERENCE TO FEDERAL, STATE,    │
│                          AND LOCAL RULES)                           │
│ 1010                                                                │
└─────────────────────────────────────────────────────────────────────┘
                                   │
┌─────────────────────────────────────────────────────────────────────┐
│       CLOSING/FUNDING:DOCUMENTS SIGNED, VERIFIED AND NOTARIZED      │
│ 1011                                                                │
└─────────────────────────────────────────────────────────────────────┘
                                   │
┌─────────────────────────────────────────────────────────────────────┐
│         CLOSING/FUNDING:FINAL CONDITIONS ESTABLISHED/MET            │
│ 1012                                                                │
└─────────────────────────────────────────────────────────────────────┘
                                   │
┌─────────────────────────────────────────────────────────────────────┐
│             CLOSING/FUNDING:FUNDS REQUESTED / DISBURSED             │
│ 1013                                                                │
└─────────────────────────────────────────────────────────────────────┘
                                   │
┌─────────────────────────────────────────────────────────────────────┐
│                   CLOSING/FUNDING:TITLE RECORDED                    │
│ 1014                                                                │
└─────────────────────────────────────────────────────────────────────┘
                                   │
┌─────────────────────────────────────────────────────────────────────┐
│ TAKE OUT: LENDER CARRIES OUT FINAL ACTION TO MOVE LOAN TO BALANCE   │
│                   SHEET OR SELLS TO OTHER ENTITY                    │
│ 1015                                                                │
└─────────────────────────────────────────────────────────────────────┘
```

FIG. 10B

METHODS AND APPARATUS FOR MORTGAGE LOAN SECURITIZATION BASED UPON MORTGAGE SERVICING STORED ON BLOCKCHAIN

CROSS-REFERENCE TO RELATED APPLICATIONS

This application claims benefit and priority to U.S. Non-Provisional application Ser. No. 17/117,929, filed on Dec. 10, 2020, and entitled METHODS AND APPARATUS FOR MORTGAGE LOAN SECURITIZATION BASED UPON BLOCKCHAIN VERIFIED LEDGER ENTRIES, which in turn claims priority to U.S. Non-Provisional application Ser. No. 16/706,238, filed on Dec. 6, 2019, and entitled METHODS AND APPARATUS FOR INGESTION OF LEGACY RECORDS INTO A MORTGAGE SERVICING BLOCKCHAIN, which in turn claims priority to U.S. Non-Provisional patent application Ser. No. 16/548,218 filed Aug. 22, 2019 and entitled METHODS AND APPARATUS FOR INGESTION OF LEGACY RECORDS INTO A MORTGAGE SERVICING BLOCKCHAIN, which in turn claims priority to U.S. Non-Provisional patent application Ser. No. 16/290,920 filed Mar. 3, 2019 and entitled METHODS AND APPARATUS FOR SERVICING AN OBLIGATION UTILIZING A BLOCKCHAIN which in turn claims priority to U.S. Provisional Application No. 62/637,693, filed Mar. 2, 2018, entitled METHODS FOR SERVICING A LOAN UTILIZING A BLOCKCHAIN. This application further claims benefit and priority to U.S. Provisional Application No. 62/946,225, filed Dec. 10, 2019, and entitled METHODS AND APPARATUS FOR AGGREGATING SELECTED MORTGAGE LOANS FOR SECURITIZATION BASED UPON BLOCKCHAIN VERIFIED LEDGER ENTRIES. The content of each of the applications listed in this paragraph is incorporated herein in their respective entireties.

FIELD OF THE DISCLOSURE

The present disclosure relates to methods for aggregating uniquely identified Mortgage Loans based upon servicing records verified via a blockchain distributed ledger. More specifically, the present invention ingests legacy mortgage servicing records into a transparent Blockchain with no single point of failure and unique identifiers to store mortgage servicing records in associated blocks allowing aggregation of mortgage loans for securitization based upon blockchain verified ledger entries.

BACKGROUND OF THE DISCLOSURE

The United State economy has experienced mortgage security crisis that resulted in financial turmoil around the world. Mortgage loan security investors had little or no avenue to assess associated risks because present loan servicing is a highly decentralized industry, featuring a labyrinth of heterogeneous standards and data formats across a wide variety of Participants including Borrowers, Servicers, Investors, Vendors, and other Persons involved in a loan servicing process.

As a result, even a small change in a status of a given Loan, or an event relating to the Loan, may take a significant amount of time to trickle down to every Participant involved in the Loan and the veracity of information is sometimes less than certain. This may result in various Participants to the Loan taking inconsistent actions, such as investment in mortgage backed securities based upon outdated data. Moreover, foreclosure efforts and other legal remedies are stymied due to As a result, Investors lose a substantial amount of money each year due to missing loan documentation and regulatory penalties.

The systems generally used by loan Servicers (are fragile, rigid and) use highly outdated mainframe programming languages, many of which were first devised decades ago and provide fragile and rigid user interaction.

A user wishing to view a status of a Mortgage Loan, or to understand reasons behind certain events pertaining to the Mortgage Loan, presently may be charged Click Through fees to access their own data they also may need to be authenticated by a relevant loan service provider and retrieve data from a variety of different locations. Making matters even more complicated, data from different locations may not be consistent.

In addition, the loan servicing industry is a highly regulated one. Each user may be custodian of at least some potentially sensitive data that may be legally protected from disclosure or inadequate data protection.

Relatedly, not all users are permitted to view all data for a Mortgage Loan. For example, while a Borrower should generally be able to see every document pertaining to the Borrower's Loan, the Borrower may not be entitled to listen to a recording between a Lender and Legal Counsel concerning a loan. Similarly, a Vendor providing an appraisal should not have access to all data in the Mortgage Loan serving file, for example, the appraiser may not be privy to a Borrowers Social Security Number, or other Personal data.

Additionally, known loan servicing systems necessarily entail asymmetrical levels of trust. Some Participants may have financial incentives to modify certain documents (or may accidentally do so). Previous systems provide little or no deterrence to document modification.

Mortgage loan Servicers make matters worse by developing proprietary "add-on" technology that causes numerous disparate systems with a propensity to create process gaps and data integrity issues.

SUMMARY OF THE DISCLOSURE

Accordingly, the present invention provides methods and apparatus for moving away from legacy Mortgage Loan securitization platforms to a Blockchain platform. The methods and apparatus presented herein provide for selection and aggregation of specific mortgage loans into a security based upon unique identification of each loan following orderly ingestion of legacy Mortgage Loan servicing records into a Blockchain ledger. The Blockchain Ledger provides transparent access to the selected records and also regulates access to Mortgage Loan Documents associated with the security thereby eliminating significant causes for historical problems with the stability of mortgage backed securities. The causes for historical problems are alleviated in part by transparency of a condition of loan assets included in a security, and certainty in Loan related information on which the security is based.

Based upon the provision of uniquely identifiable information and real time, or close to real time availability of reliable data, the present invention also provides a mechanism for more reliable and accurate oversight of loan related investment.

According to the present invention each respective loan is associated with a blockchain ledger entry that includes an identifier unique. The identifier may be assigned upon ingestion of the loan into the blockchain ledger, or upon origination of a new loan on the blockchain ledger. Typically, the unique identifier will be fifty characters or less. The information is distributed and synchronized across multiple networks which provides certainty to data accuracy. Mortgage loan servicing may generate Smart Contracts that provide certainty to a type of transaction undertaken during loan servicing. Some aspects of data included in the Blockchain Ledger may be protects, but a record of its existence always remains on the blockchain. Entities with different roles related to a loan may have access to different information. Such as, by way of non-limiting example, a Certified Mortgage Banker (CMB) may be permissioned to view data on the platform and owners/servicers of a Collateralized Debt Obligation (CDO) may have access to information related to a last failure, an owner/servicer of a collateralized mortgage obligation may have still different permissions to piece of the information included on the blockchain, all identified via the unique loan identifier.

The present invention provides comprehensive verification of Mortgage Loan information, physical and virtual storage location of related documents, and safeguards against subsequent intentional or accidental document modification. The present invention also tracks access to documents, and provides the same data, in the same state across an inherently decentralized process and system for quantifying the process. The present system also eliminates mechanisms for charging click through fees to Customers to access their own data ensures transparency in Mortgage Loan Obligation servicing processes.

The present invention utilizes Blockchain technology to provide Participants to a given Loan with an up-to-date certified correlation of actions executed, recordation of an identity of who executed respective actions, and certifying data, such as a ledger of actions taken on a Loan, as well as data associated with each action (e.g., time, place, user), thus ensuring that Participants: (a) can access only specific Loan Documents that a particular Participant is authorized to access; (b) cannot modify a previous action; and (c) can easily append new Loan Action to a Blockchain in a manner that links new Loan Action to previous events (e.g., a request for a new loan).

Additionally, in some embodiments of the present invention, an Ingestion Controller is provided to receive data in varying formats such as disparate formats utilized by disparate Participants and Vendors. Presently, varying formats are responsible for considerable delay, inaccuracy, and difficulty in Obligation tracking in a Mortgage Loan servicing process.

In some embodiments, the Ingestion Controller is configured to accept legacy mortgage servicing records in a Vendor Format and write the legacy records to a Blockchain pertaining to a Loan or other Obligation in a same Vendor Format as the legacy records was received. In other embodiments, an Ingestion Controller converts data from a Vendor Format to a standardized Servicer Format utilized by Blockchain and writes converted legacy records on the Blockchain as one or more Ledger Entries.

In still other embodiments, a Vendor is one of multiple known Participants. Each Participant may utilize a respective known (if still heterogeneous) data format. The Ingestion Controller is operational to convert data from a Vendor Format to a Servicer Format, and store the data in the Servicer Format on an associated Loan Blockchain. In some embodiments of the latter embodiment, the Ingestion Controller may translate data retrieved from a Loan Blockchain in a Servicer Format to a requested Vendor Format. Data retrieved from a Loan Blockchain may be transmitted to a Participant in one or both of the Servicer Format and the Vendor Format.

Preferred embodiments utilize a single Blockchain for all entries related to Mortgage Loan Servicing, although some embodiments may include multiple Blockchains to support an Obligation or Mortgage Loan servicing, such as a Vendor specific Blockchain or a function specific Blockchain (e.g. payment transaction Blockchain or loan owner Blockchain). A master Blockchain may track entries into other Blockchains included in a hierarchical or relational group of Blockchains.

In still another aspect, an Artifact and/or acknowledgement of the generation of an Artifact may be included in a Blockchain. An Artifact may include one or more of: a Smart Contract; an online submission with electronic signature verification; an image of a document or other quantifiable execution of an action may be stored in electronic format.

In some embodiments, the present invention may be practiced as a method for servicing a Mortgage Loan utilizing a Blockchain. A Mortgage Loan Obligation may be established based upon a transfer of funds from a first party to a second party and the Obligation may be secured with a Collateral Asset, such as mortgaged real property. A Blockchain is initialized on a computer server that is accessible via a digital communications network. The Blockchain may include multiple time sequential blocks, with each Block storing information related to the Obligation.

The Obligation may be memorialized in the Blockchain as a Mortgage Loan agreement. A first additional Block may be added to the Blockchain, with the first additional Block including a memorialization of the Mortgage Loan agreement. The Blockchain may be transmitted to a Loan Participant via the communication network.

The Blockchain may be configured to include Action data associated with a Loan Action in a Block in the Blockchain and appending the Action data to an end of the Blockchain as a second additional Block. An access right Block may specify which portions of a first additional Block and a second additional Block a Loan Participant may access and how.

A communications network such as the Internet may be used to transmit the Blockchain to the Loan Participant. The Blockchain may include blocks storing information that memorialize a Mortgage Loan Obligation, a first additional Block that memorializes the Mortgage Loan agreement, and subsequent blocks containing documents of records of actions taken. Access may be granted to the first additional Block, the second additional Block and subsequent blocks on the Block chain based upon the established access rights associated with a User.

In another aspect, notification of a payment related to a Mortgage Loan may be memorialized in the Mortgage Loan agreement and the notification of the payment may be stored in a third additional Block on the Blockchain. An access right for the Loan Participant may be established to the third additional Block. Access rights typically include one or more of the abilities for a Loan Participant to know that the Block exists but not be able to access information included in the Block, the ability to write to the Block and the ability to read the Block.

In some embodiments, an Artifact may be received quantifying an inspection of the Collateral Asset such as a mortgaged property. The Artifact may be stored in an additional Block and an access right established for the Loan Participant to the additional Block. An Artifact may, for example, include an appraisal of the Collateral Asset (mortgaged property) and be stored in still another Block with access rights established for the Loan Participant to the additional Block.

In another aspect, a quantification of an action, such as a correspondence regarding the Mortgage Loan agreement may be received and stored in a Block with an access right established for the Loan Participant to the Block. Action data may include, for example, one or more of: an identity of a Person executing the Loan Action and a resulting Loan balance following the Loan Action. In some embodiments, a previous Block of the Blockchain relating to the Loan Action may be cross referenced and a date for a follow-up action stored in the Blockchain. The Loan Action may be prompted by a Loan Servicing File that includes a record of at least one of: a work order, an email, correspondence and conversation recordation. A Loan Servicing File may be a Hardcopy File, and the Action data may further include information related to a physical location of the Hardcopy File. Action data may further include accessing information to retrieve an electronic facsimile of the Hardcopy File via the communications network. In addition, the Blockchain may include an electronic facsimile of a hardcopy Loan Servicing File. The electronic facsimile may be stored off Blockchain.

Some embodiments additionally include the step of executing a smart contract and storing the smart contract on the Blockchain or as an associated Off-Blockchain record. The Blockchain may be accessed via a network access device, such as a PC or a mobile smart device connected to a communications network, such as the Internet. In some embodiments, information stored on the Blockchain may be transmitted from a uniquely identified smart device.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure:

FIGS. 9A-9B illustrate additional method steps that may be used to implement the present invention.

FIGS. 10A-10E illustrate method steps that may be used to implement the present invention.

DETAILED DESCRIPTION

Figure 1:
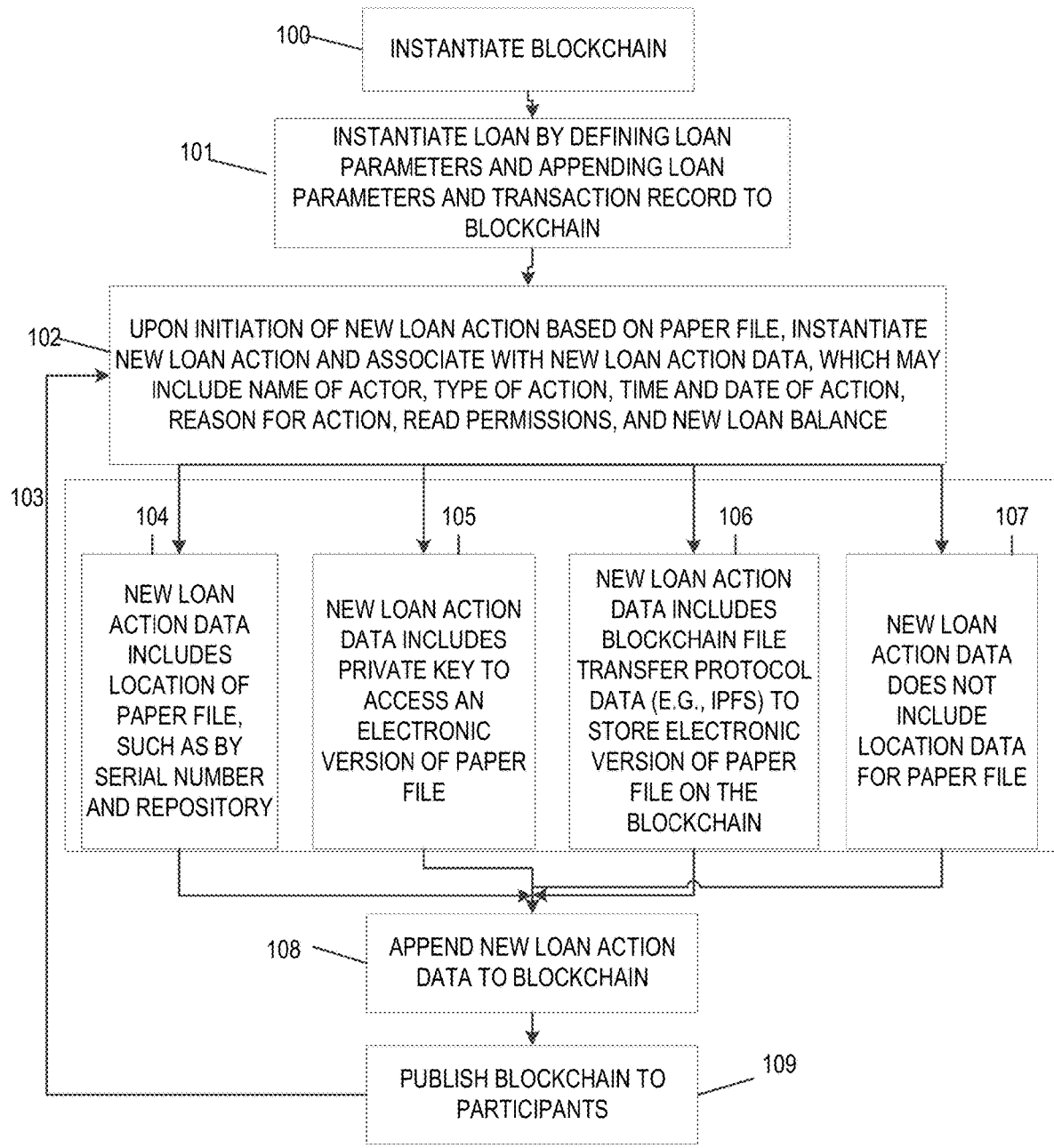
FIG. 1 illustrates an exemplary flowchart of the addition of a new Loan Action and associated new Action data to a Blockchain.

The present disclosure provides generally for methods and apparatus for instilling transparency, security, and auditability in a Mortgage Loan servicing process by ingesting Legacy mortgage loan serving records onto a Blockchain platform.

According to the present invention, a Participant to a Loan operates a computerized node to access a Blockchain memorializing executed actions that relate to a Mortgage Loan. When a Participant initiates a new Loan Action based on an event, such as receipt of a work order, the Participant creates a new Block on an associated Blockchain, encodes associated new Action data on the new Block, and transmits an updated Blockchain to Participants. A Participant may include a Person accessible via an automated network access device or an automaton, such as an Artificial Intelligence ("AI") bot or the like.

In the following sections, detailed descriptions of examples and methods of the disclosure will be given. The description of both preferred and alternative examples though thorough are exemplary only, and it is understood that variations, modifications, and alterations are within the scope of the present invention. It is therefore to be understood that the examples do not limit the broadness of the aspects of the underlying disclosure as defined by the claims.

Although presented and described in view of Mortgage Loan Servicing, the present method may be applied to a broad field of dedication of one or more Assets by a first party to the benefit of a second party.

Glossary

"Action" as used herein, refers to an executed method step that is part of, or the entirety of a process.

"Artifact" as used herein refers to an item containing information or representative of information. Examples of Artifacts include one or more of: a document, a smart contract, an electronic communication, a voice recording, a video clip and a picture or other image data.

"Asset" as used herein, refers to an item with an associated value such as a real property, wherein ownership or use of the real property may be transferred from a first Person to a second Person.

"Blockchain" as used herein, refers to an implementation of an append-only, computerized linked data record (a "Block") known to those in the art as a Blockchain, which is transmitted to, and stored upon a plurality of computerized nodes operated by a plurality of Participants upon an appending action. As used herein, Blocks on the Blockchain are generally numbered as $B_N$, where $_N$ is an integer. Where $_N$ is not assigned a specific integer, $B_N$ is presumed to be an arbitrary Block on the Blockchain; if $_N$ is a specific integer, then $B_N$ is presumed to be a corresponding Block (e.g., $B_1$ is the first Block on the Blockchain). Unless otherwise indicated, $B_N$ occurs sequentially before $B_{N+1}$. Where $B_N$ and $B_M$ are described separately, $_M$ is presumed to be an integer not equal to $_N$. A Block may be time stamped and secured and bound to each other using cryptographic principles (i.e. chain).

"Collateral" as used herein refers to an Asset, property or other item of value used to guarantee execution of an Action.

"Electronic File" as used herein, means any Loan Document captured in a digital format. By way of non-limiting example, an Electronic File may include one or more of: a smart contract, images, recording of phone calls, and electronically recorded data.

"Hardcopy File" as used herein, refers to any hard copy medium embodying a transaction or other action related to a Loan. By way of non-limiting example, a Hardcopy File may be one of: work order, promissory note, or documentation.

"Hash" as used herein means an encrypted value of a fixed length.

"Hashing" as used herein means that act of converting a string of unencrypted data of variable length into a string of encrypted data of a fixed length.

"Ingestion Controller" as used herein, refers to a computerized server in logical connection with a network access device and with software executable on demand, which is configured to accept New Loan Data from a Vendor and, in some embodiments, transmit desired blocks from the Blockchain to a Vendor.

"Loan Document" as used herein, means a text or image data quantified within boundaries and related to a Mortgage Loan.

"Loan Servicing File" as used herein, means one or both of a Hardcopy File and a Blockchain including multiple ledger entries containing one or more of: information, records of completed or anticipated Actions, Artifacts and documents related to a Loan.

"Mortgage Loan" as used herein, refers to provision of funds by a first party for the benefit of a second party for use by the second party with the provision of real property Collateral to the first party and agreed upon terms of repayment of the funds. A Mortgage Loan may be memorialized in a contract between the first party and the second party. Preferably the contract is quantified in a written document (electronic or hardcopy) and includes party identifiers, terms and conditions of the contract, and methods of meeting an Obligation (such as, for example, making a payment) and repayment of the loan.

"Obligation" as used herein refers to an agreed upon action or series of actions to be taken by or on behalf of an Obligor.

"Obligor" as used herein refers to a Person bound to perform an Action or series of Actions.

"Participants" as used herein, refers to Borrowers, Investors, Vendors, and Servicers that are parties to a Loan.

"Person" as used herein refers to a legal entity capable of ownership of an Asset and/or being bound to execute an Action.

"Servicer" as used herein refers to a Person tracking and facilitating fulfillment of Obligations by an Obligor. A Loan Servicer tracks fulfillment of Obligations related to a Loan type Obligation.

Referring now to FIG. 1, a list of exemplary method steps that may be executed in practicing some embodiments of the present invention are illustrated. At 100, a Blockchain is instantiated. At 101, first Block $B_1$ is instantiated. $B_1$ may include the Loan Parameters. By way of non-limiting examples, Loan Parameters may include a description of mortgaged property included in the Loan; terms for returning a loan amount, e.g., a schedule of payments and ultimate deadline to pay back loan amounts involved; Loan; amortization tables; names of parties to the loan; and information relating to the Property, such as an appraisal amount.

Blocks 102-108 illustrate steps involved in the processing of a new Loan Action. A Loan Action may include, but is not limited to, payments on the loan; phone calls between a Borrower and a Loan Servicer; audits on the loan; actions necessary to protect the Collateral of the loan (e.g., property appraisals); foreclosures; additional services offered based upon one or both of: The Loan and Collateral; and a default on a Loan payment or other Obligation.

At 102, the new Loan Action is instantiated based upon or relating to a Loan Servicing File, such as a Loan Servicing File. A Loan Servicing File may store a wide range of action initialization media. The media may include, but is not limited to, a promissory note; a letter requesting some action be taken on the loan; supporting documentation such as an appraisal of Collateral and an audio recording of a phone call or other conversation. A Loan Servicing File may be a Hardcopy File or an Electronic File. If a Loan Servicing File is a Hardcopy File, then the Hardcopy File might be digitized, leading to the creation of an Electronic File based on the Hardcopy File. If $(_{N-1})$ Block-creating actions have occurred on the Blockchain, then the instantiation of the new Loan Action results in the creation of a new Block, $B_N$.

A new Loan Action may be associated with new Action data, which may include (but is not limited to) the name of a Person requesting and/or performing the new Loan Action; a type of Action; a time and date of the request; a time and date of requested performance; a deadline for complying with a request; in the case of a communication session, such as a phone call, video conference, a live interaction, a duration of the communication session; a reason for executing a Loan Action; a change to a pending Obligation, such as a loan balance, as a result of the Loan Action; a read permission for $B_N$; and in the case of an Action taken in response to a request documented at Block $B_M$, a cross-reference linking $B_N$ to $B_M$. Loan Action data may also include metadata.

In some embodiments a link is established in a platform of apparatus supporting a related Blockchain that links a related Loan Servicing File with $B_N$ by adding to Action data information related to the Loan Servicing File. This may be particularly useful in situations with a Loan Action based upon content included in a Loan Servicing File. For example, possible, non-exhaustive options for generating a link may include one or more of: Action data includes location of a Hardcopy File 104; Action Data includes a private key to access all or part of a file 105; Action Data includes Blockchain file transfer protocol data (PFS) to store an electronic version correlating with a Hardcopy File on the Blockchain 106; Action Data does not include a location of a Hardcopy File; Action Data is appended to a Blockchain 108 and a Blockchain is published back to Participants 109.

Further, FIG. 1 is a non-limiting example illustrating a Loan Servicing File that is, at least initially, a Hardcopy File. At 104, new Action data includes a physical location of a Hardcopy File, such as by one or more of: serial number; file custodian identification; and repository. Association of a Hardcopy File with a Blockchain based electronic system may be used to serve as an intermediate step for a loan Servicer executing Action steps to modernize loan servicing database, and still keep some amount of information at a hardcopy data warehouse. By way of non-limiting example, a user opting to implement a method using step 104 includes on $B_N$ that a promissory note underlying a loan is located in Warehouse 4, Room 120, File Cabinet 3. By way of another non-limiting example, if $B_N$ stores Action data regarding a phone call with a borrower, $B_N$ may indicate identification information and a file path for a computer server on which one or both of an audio recording and transcription of a phone call is stored. As discussed more fully below, a computer server includes a processor in logical communication with a storage medium storing executable code that is executable on command to cause the processor to execute method steps.

Block 105 illustrates another possibility for linking a hardcopy Artifact, document or file with Action data, by way of an Electronic File. At 105, the Electronic File is uploaded to secure data storage via a communications network, such as the Internet. Due to a potentially sensitive nature of an Electronic File (e.g. a file with content relating to Personally identifiable financial documents), the Electronic File may be encrypted. For example, encryption may be implemented via Rivest-Shamir-Adleman ("RSA") cryptosystem for secure data transmission or another cryptography method for data transmission and/or storage. RSA cryptography is an asymmetric encryption scheme, comprising the use of a private and public key.

In some embodiments of the present invention, Participants receive a public key to allow encryption of information included in an Electronic File stored on a Blockchain. However, in some embodiments, at 105, only those Participants authorized to view an Electronic File receive an affiliated private decryption key. Accordingly, a Participant authorized to view $B_N$ is provided with a mechanism to access to the Electronic File. Similarly, 106 allows a Participant authorized to view $B_N$ to view the Electronic File directly on a Blockchain, if the particular Blockchain implementation utilized allows for file storage. Blocks 105 and 106 could also cover a Loan Action prompted by a Loan Servicing File that originates as an Electronic File. In some embodiments, an Electronic File stored $B_N$ may not be associated with a Hardcopy File 107.

Entry of new Action data, including reference to the Loan Servicing File described by 103, may be aggregated and associated Action data is added to Block $B_N$, which is appended 108 to the Blockchain.

In addition, the Blockchain may be published 109 to all Participants or to selected Participants. Publication is an important element of Blockchain technology, as it allows for the nonrepudiation of a given Block. In some embodiments, a Participant may possess a current copy of a Blockchain and yet the Participant may not have read access to one or more blocks included in the Blockchain.

Figure 2:
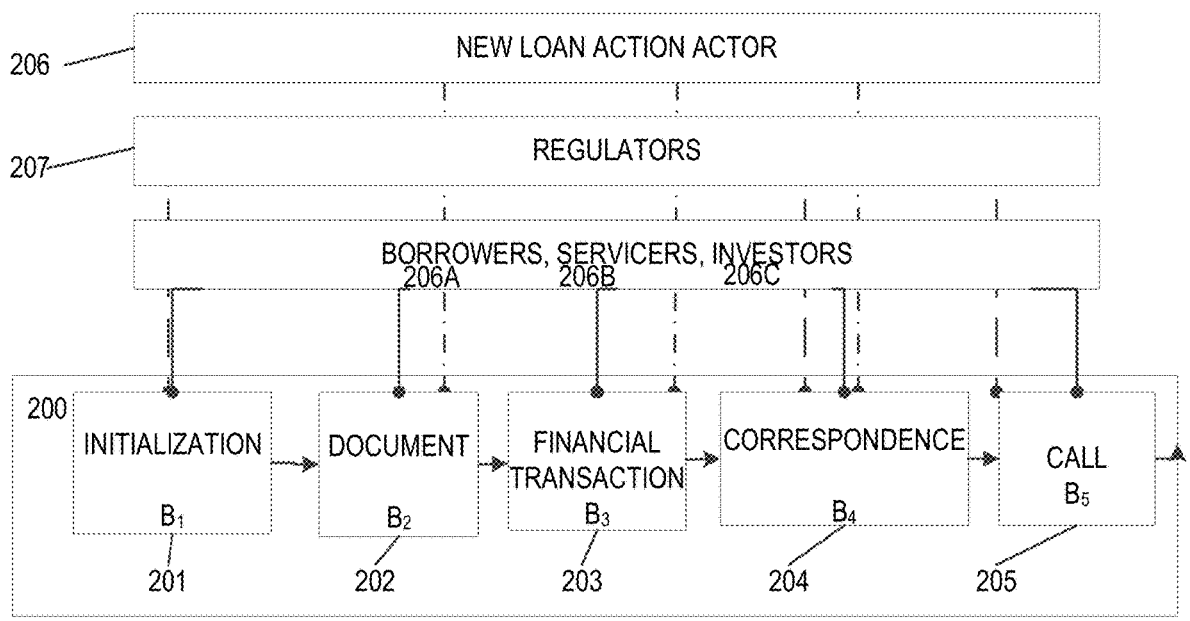
FIG. 2 illustrates an exemplary Blockchain with read access permissions defined.

Referring not to FIG. 2, an exemplary section of a Blockchain 200 is illustrated, including a Block's read permissions for a variety of examples of Participants. In this non-limiting example, the Blockchain illustrated includes five Blocks, 201-205. Pertinent classes of Participants in this example include Borrowers; Servicers; Investors 206A-206C; Regulators 207; and an Action Actor 206 executing an Action. $B_1$ 201 corresponds to an initialization of the loan. Data stored on $B_1$ may include an electronic copy of the promissory note; the original balance of the loan; the payment term; and the Collateral for the loan. The lines ending in dots demonstrate read access. For example, it may not be desirable to give every Participant one or both of read and read and write access to every Block. For example, a new Loan Action Actor 206, may not be provided read access to data in a Block that includes a promissory note and other sensitive information stored on $B_1$ 201. On the other hand, one or more Regulators 207 may be properly vetted and be provided audit authority to all Blocks based upon the Regulators' 207 interest in sensitive information. Additionally, one of the primary goals of the present disclosure is increasing transparency for one or more Participants, such as: Borrowers 206A, Servicers 206B, and Investors 206C. Accordingly, as demonstrated by FIG. 2, only Regulators 207 and Borrowers 206A, Servicers 206B, and Investors 206C may be provided access to $B_1$ 201.

A document $B_2$ 202 or other Artifact, may in this example, correspond to a Loan Servicing File initiating a request on behalf of a new Loan Action actor, which has access to view the document $B_2$ 202 it added to the Blockchain 200. A financial transaction $B_3$ 203, may in some examples, be linked to document 202 at $B_2$. Correspondence $B_4$ 204 may also be stored in a Block $B_4$. Correspondence may include hardcopy, electronic communication, facsimile, or other Artifact conveying information from a first Person to a second Person. Similarly, a record of a Call $B_5$ 205 is exemplary of another type of Blocks which may exist within the Blockchain 200 memorializing Actions arising from an Obligation, such as a loan. According to the present invention, a record of a call may include one or more of an audio file, a transcript of a conversation, a video file, or other record of an: in Person, telephonic or voice/video over IP (VOIP) conversation.

Records of other information and Artifacts may also be stored in a Block, such as, by way of nonlimiting example: scanned documents; e-signed documents; spreadsheets; receipts of payment; documents validating an identity; notary seal; appraisals; photographs; comparable property descriptions; proof of funds; evidence of income; biometric measurements, declarations of race and/or ethnicity, evidence of residency, evidence of citizenship; parties of interest; co-signers; guarantors; next of kin; insurance policies and/or summaries; and other information that may be memorialized or quantified in an electronic format and stored in a Block.

Figure 3:
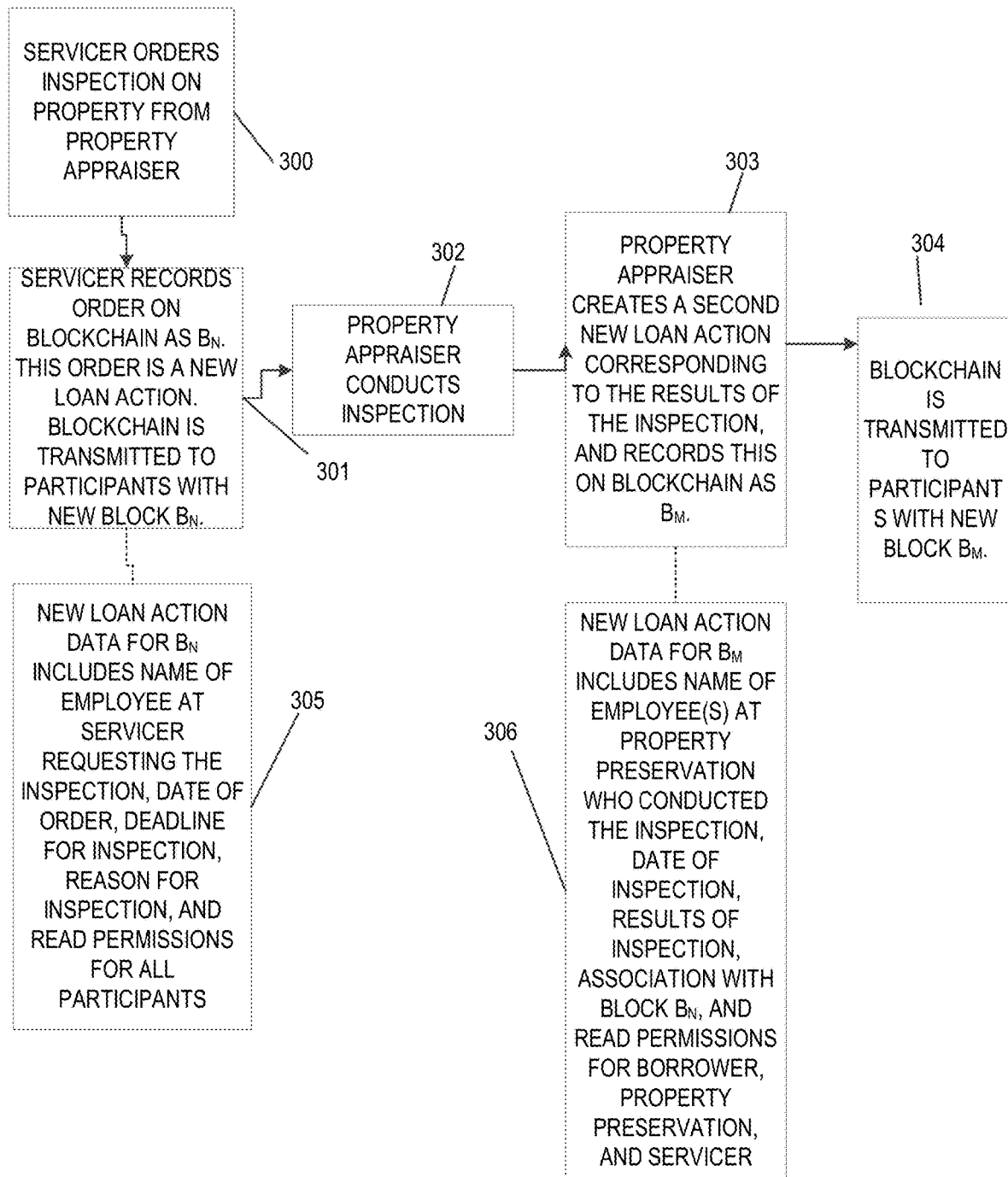
FIG. 3 illustrates a mortgage-specific, non-limiting example of the interaction of two Participants with a Blockchain.

Referring now to FIG. 3, exemplary method steps are illustrated that may be executed in some embodiments of the present invention. The example illustrated generally relate to a pair of linked transactions related to a mortgage. At 300, a mortgage Servicer, which is a Participant, orders an inspection on Borrower's Property from another Participant, such as, for example, Property Appraiser.

At 301, as part of the process of ordering the inspection, Servicer records the inspection order on Blockchain as Block $B_N$. The order constitutes an Action to commence a new Loan. The Action is associated with Action data 305. In this non-limiting example, the Action data 305 recorded on Block $B_N$ includes the name of the employee at Servicer requesting the inspection; data of the order; deadline for inspection; reason for inspection; and instructions allowing all Participants to read $B_N$. Once a new Loan Action and new Action data are recorded on new Block $B_N$, the Blockchain 304 is transmitted to Participants. In some embodiments, Property Appraiser records a confirmation of receipt on new Block $B_{N+1}$, or another Block linked to $B_N$.

At 302, a Vendor who is a Property Appraiser conducts the ordered inspection. Upon completion of the inspection, at 303, Property Appraiser instantiates a new Loan Action on Block $B_M$ (where $_{M>N}$). This new Loan Action will have associated with a new Action data 306, pertinent information related to the inspection. This new Action data 306 recorded on Block $B_M$ includes the name of the employee(s) at Property Appraiser who conducted the inspection and reviewed its results; the results of the inspection; association with Block $B_N$; and read permissions for Borrower, Property Preservation, and Servicer.

Finally, the updated Blockchain is transmitted 304 to Participants with new Block $B_M$. Notably, even those Participants who do not have read access will receive the updated Blockchain. Such Participants will (a) be aware that the Blockchain has been updated with new Block $B_M$; and (b) be able to see the Hash value, previous Block Hash value, and nonce of $B_M$. This is desirable to achieve the nonrepudiation trait of Blockchain.

In some embodiments, it may also be desirable to encode on the Block $B_M$ data that all Participants can access. In the non-limiting example shown in FIG. 3, all Participants have read access to $B_N$, which stores the inspection order, but only a limited subset of Participants have read access to $B_M$, which stores the results of the inspection. Although such results may be confidential, it may nonetheless be desirable for a Participant that can read $B_N$ to be aware that $B_M$ contains the result of the inspection order stored at $B_M$. Accordingly, the new Action data for $B_M$ can also specify the read access of each element of new Action data for $B_M$, and may allow read access to all Participants for the datum linking $B_M$ to $B_N$.

Again, the implementation set forth in FIG. 3 is merely a non-limiting example. In a generic situation, Property Appraiser could stand for any Vendor or other provider assisting a Loan Servicer, and the inspection could be any action taken in furtherance of the Loan.

Currently, a significant problem facing the loan servicing industry is a myriad of format types used by Vendors and Servicers in processing information. Many Vendors have their own proprietary data formats, which may render adding data 303 to the Blockchain 304 difficult.

Figure 4:
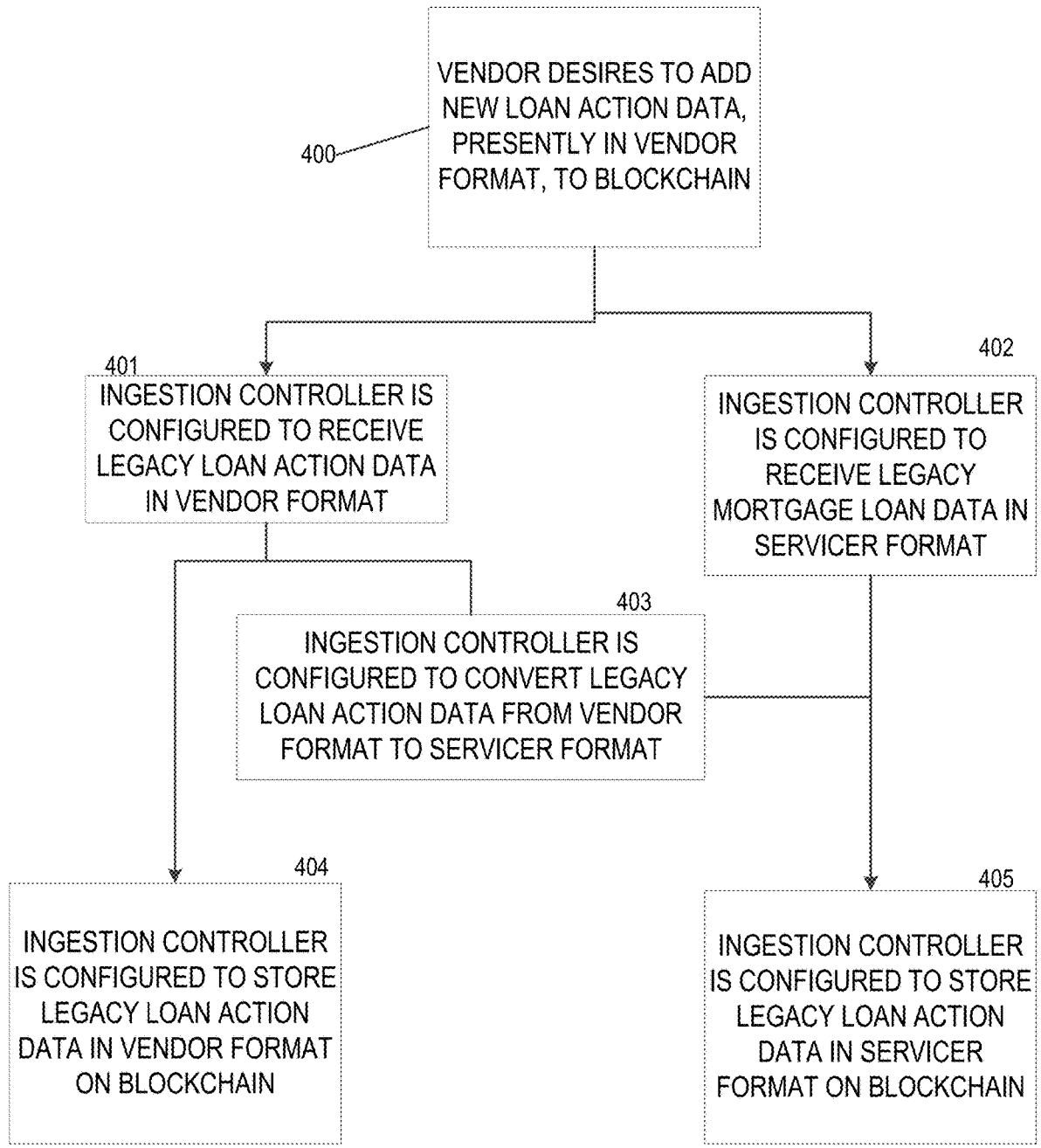
FIG. 4 illustrates three exemplary embodiments of an Ingestion Controller.

Accordingly, referring now to FIG. 4, in some embodiments it may be desirable to configure a Ingestion Controller (discussed in more detail below) to assist in converting data to and from the proprietary formats of the various Participants (the "Vendor Format"). The Vendor Format is in contrast to a standardized format utilized by the Servicer, the Servicer Format. While this non-limiting example assumes that Servicer Format is ordinarily more desirable than Vendor Format, this is not required. At 400, a Vendor (such as, in FIG. 3, Property Preservation) desires to add new Action data to the Blockchain. The Ingestion Controller may be configured in one of at least three alternative ways.

Alternative A (as demonstrated in 401 and 404): at 401, the Vendor uploads to the Ingestion Controller new Action data in Vendor Format. At 404, Ingestion Controller instantiates a new Block on the Blockchain with the new Action data stored in Vendor Format. This Alternative may be desirable where a plurality of Vendors associated with the Loan, possibly along with Investors, Borrowers, and Servicers, use a same or similar data format to the Vendor Format. Alternative A may also be desirable if Vendor uses any proprietary encryption techniques and wants decryption to occur outside the Blockchain environment.

Alternative B (as demonstrated by 402, 403 and 405): at 402, the Ingestion Controller receives Legacy mortgage loan servicing records in a Servicer format and at 405, the Ingestion Controller instantiates a new Block on the Blockchain with the Action data stored in Servicer Format. In Alternative B, the work in converting the Action data to Servicer Format is done by Vendor.

Alternative C (as demonstrated by 401, 403, and 404): at 401, the Vendor uploads to the Ingestion Controller Action data in Vendor Format. At 403, the Ingestion Controller converts the data from Vendor Format to Servicer Format, and at 405, the Ingestion Controller instantiates a new Block on the Blockchain with the new Action data stored in Servicer Format. In Alternative C, the work in converting the new Action data to Servicer Format is done by the Ingestion Controller. Accordingly, Alternative C may be preferred desirable where a Loan is associated with limited, known Vendors whose respective Vendor Formats may be pre-programmed into the Ingestion Controller, allowing for ready conversion between the respective Vendor Formats and the Servicer Format. This allows each Participant to retain its respective proprietary format, while also providing a universal format (the Servicer Format) for Participants like Borrowers or Investors who may not have proprietary formats.

A significant advantage of the present invention is that it reconciles a present state of the loan servicing industry. While there is a primary entity responsible for handling the day-to-day servicing of a Loan (described herein as the Servicer), the Servicer outsources a variety of tasks to Vendors. Borrowers and Investors may have their own respective interests in a Loan. However, during the lifetime of a given Loan, each of multiple Participants may change identities multiple times. For example, a Servicer that created $B_1$ of the Blockchain may assign Servicer's rights and Obligations under an underlying contract to a different Servicer. In some embodiments, the present invention provides a standardization of loan servicing process on a Blockchain, with a smart contract protocol incorporated onto the Blockchain to facilitate contracts and/or other documents underlying an associated Loan process. A smart contract may include a self-executing contract with terms of agreement directly written in computer code. In some embodiments, a smart contract may be executed without a physical hardcopy.

Figure 5:
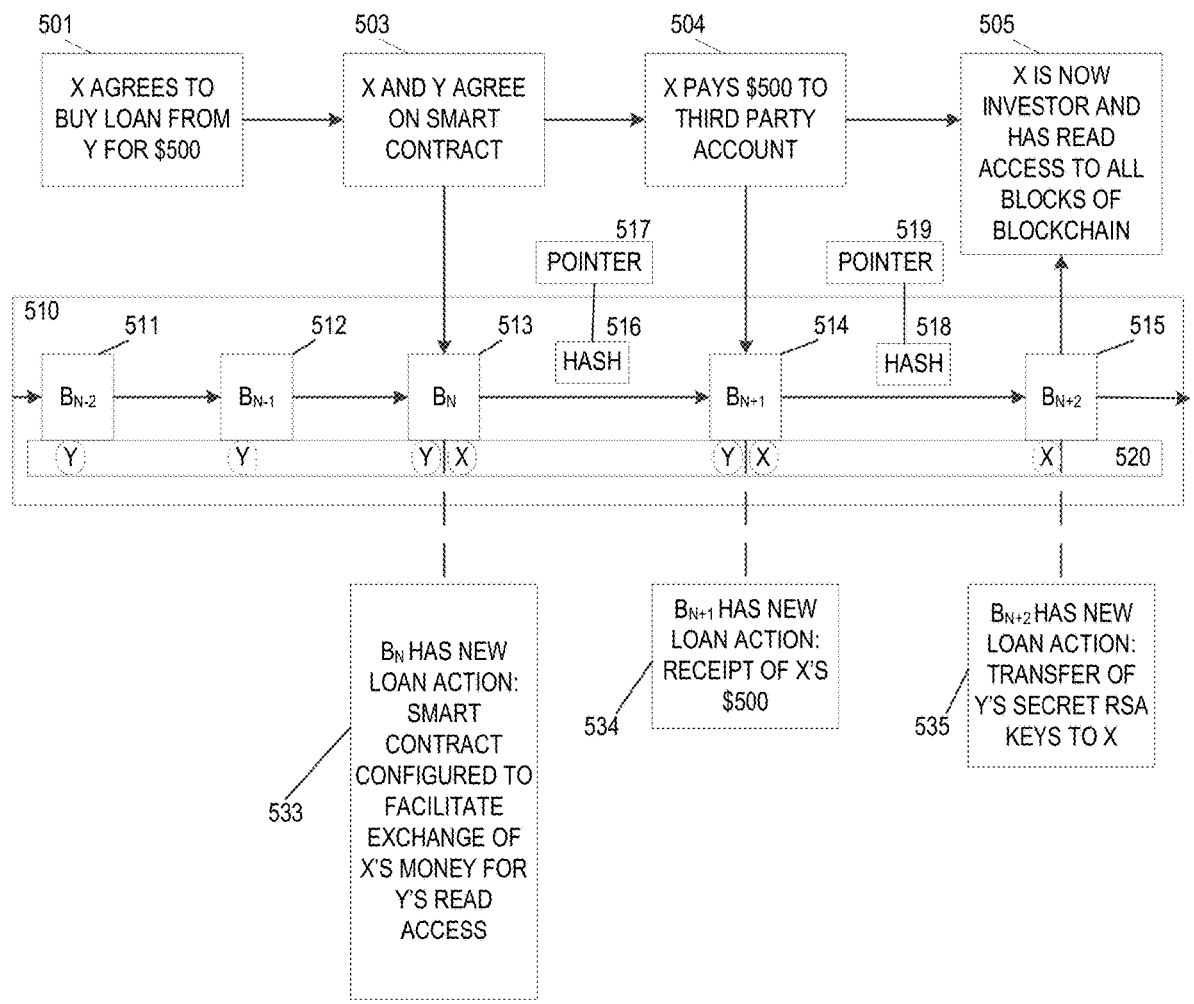
FIG. 5 illustrates an exemplary smart contract transfer of Investor status between a Company X and Company Y.

Referring now to FIG. 5 some embodiments of the present invention are illustrated that include a smart contract protocol applied to the Blockchain. FIG. 5 demonstrates a non-limiting example of a smart contract for transferring an Investor role from a Company Y to a Company X. One pertinent portion of the Loan Blockchain is shown at 505, with read access for each Block demonstrated at 520. Note that 520 only shows presence or absence of read access for X and Y; other Participants such as Borrower may have read access to these blocks. Thus, Y is the Servicer and has read access to blocks $B_{N-2}$ at 511 and $B_{N-1}$ at 512, prior to any agreement to transfer the Servicer role.

At 501, X agrees to buy the underlying Loan from Y for $500. Since the underlying Loan is implemented using the present method on Blockchain 510, at 520X and Y agree to implement the transfer on a smart contract. This smart contract constitutes a new Loan Action, and accordingly is recorded at 513, $B_N$. X now becomes a Participant, and both X and Y have read access to $B_N$.

The smart contract at $B_N$ has new Action data corresponding to 512. In particular, in this non-limiting example, the smart contract is a program configured to (a) store Y's Investor access credentials (e.g., Y's secret key in an RSA cryptography scheme) 533; (b) receive in a third party account the $500 from X 534; (c) upon receipt of $500 from X, transfer Y's Servicer access credentials to X 535, wherein the access credentials may include secret RSA keys; and (d) transfer the $500 from the third party account to an account designated by X for receipt of the $500.

At 504, X pays $500 to a third party account. This event is recorded as a new Loan Action at 514 Block $B_{N+1}$. This new Loan Action at 514 Block $B_{N+1}$ may include an acknowledgement of a receipt of X's $500. At 505, both X and Y may be provided read access to $B_{N+1}$.

Finally, the smart contract program itself executes and creates Block 515 $B_{N+2}$. The associated new Loan Action 514 records and executes the transfer of Y's access credentials to X at 504. X now has read access to at least all blocks beginning with $B_N$. In some embodiments, it may be desirable upon completion of this transfer to give X read access to all blocks preceding $B_N$, and/or revoke Y's access credentials to the entire Blockchain. This method of assignment is highly desirable, as it provides an easy method to transfer data about the Loan to X, instead of the present environment, which involves hours of digging through data warehouses.

Figure 6:
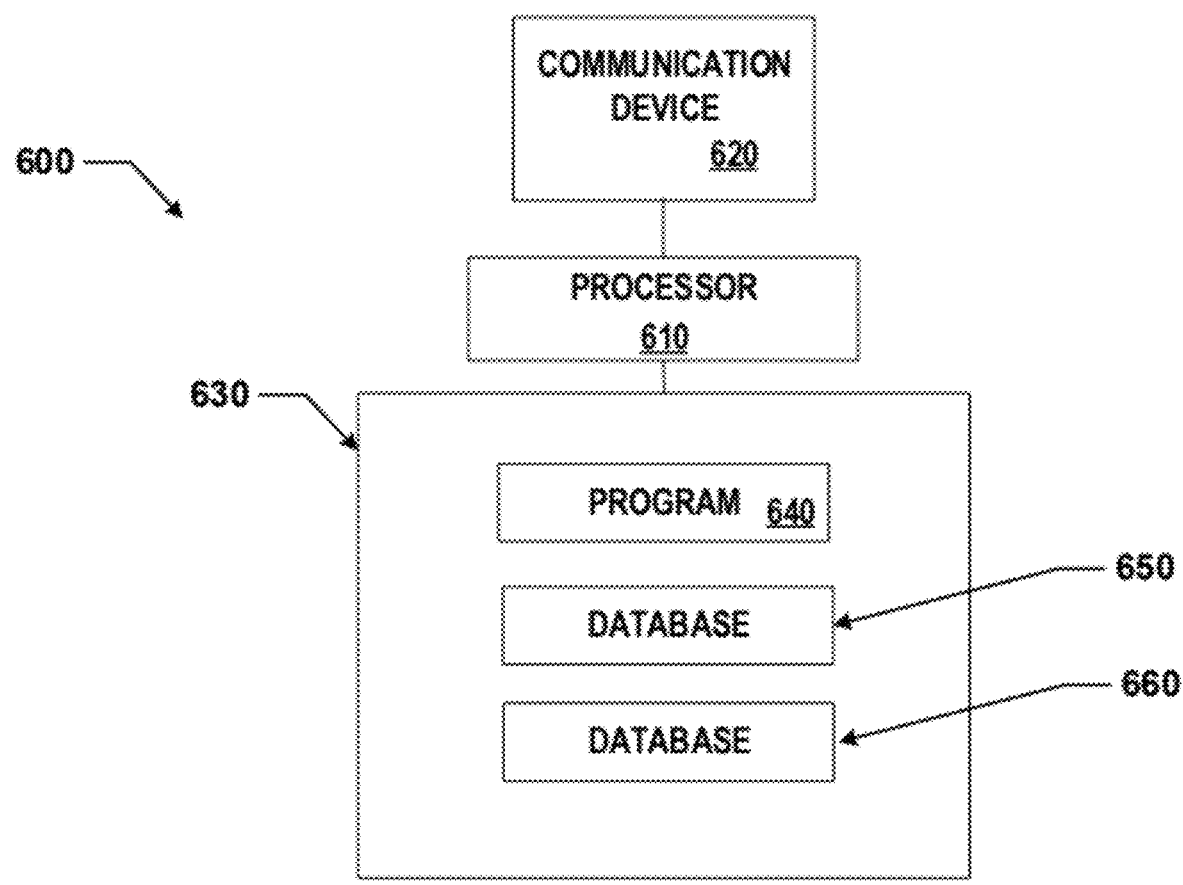
FIG. 6 illustrates apparatus that may be used to implement aspects of the present disclosure including executable software.

Referring now to FIG. 6 a controller 600 is illustrated that may be utilized to implement some embodiments of the present invention. The controller may be included in one or more of the apparatus described above, such as the Blockchain Server, and the Network Access Device. The controller 600 includes a processor unit 610, such as one or more semiconductor based processors, coupled to a communication device 620 configured to communicate via a communication network (not shown in FIG. 6). The communication device 620 may be used to communicate, for example, with one or more online devices, such as a Personal computer, laptop, or a handheld device.

The processor 610 is also in communication with a storage device 630. The storage device 630 may comprise any appropriate information storage device, including combinations of storage devices (e.g., hard disk drives and server farms), solid state drives, optical storage devices, and/or semiconductor memory devices such as Random Access Memory (RAM) devices and Read Only Memory (ROM) devices.

The storage device 630 can store a software program 640 (executable software code executable on demand) for controlling the processor 610. The processor 610 performs instructions of the software program 640, and thereby operates in accordance with the present invention. The processor 610 may also cause the communication device 620 to transmit information, including, in some instances, control commands to operate apparatus to implement the processes described above. The storage device 630 can additionally store related data in a database 650 and database 660, as needed.

In various embodiments, a controller 600 may be incorporated into a network access device such as a smart device (e.g. a smart phone or smart tablet); a Personal computer (PC), a network server, or specialized user interactive device. Controllers may also be incorporated into specialized equipment, such as a scanner or printer. Typically, the scanner or printer will be in logical communication with a distributed network, such as a wide area network (WAN), a virtual private network (VPN) and/or the Internet. A Blockchain will be stored on a server (Blockchain Server) including one or more controllers 600 with processors operative via executable software to perform the method steps described herein. Typically, the Blockchain Server will be accessible via a communications network via network access device with a controller executing executable software.

Figure 7:
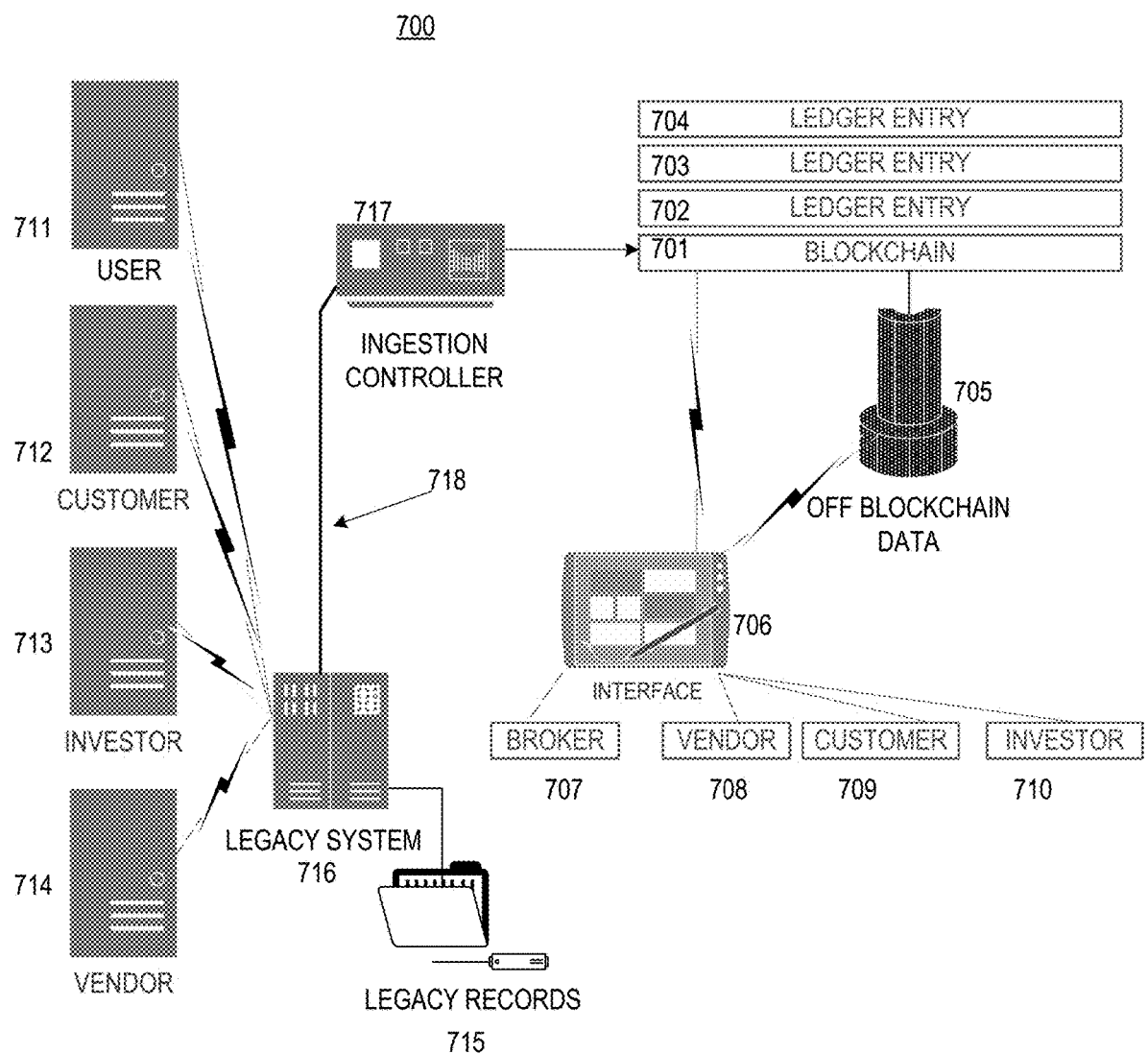
FIG. 7 illustrates a Block diagram of components involved in the ingestion of legacy Mortgage Loan servicing records into a Blockchain based Mortgage Loan servicing platform.

Referring now to FIG. 7, a system 700 of Blockchain ingestion components for ingestion of legacy mortgage servicing records into a Blockchain is illustrated. According to the present invention, Legacy Records 715 are generated by legacy mortgage servicing Participants 711-714, which typically include: users 711 (such as a broker); a customer 712; an investor 713; and a vendor 714 (such as a property appraiser, insurance agent, etc.). In general, the legacy system 717 does not include actions, such as comments, conversation and transactions in a history of loan activity included in legacy records 715, such actions are often absent from the Legacy Records 715. The legacy records will typically include documents and metadata associated with the documents. Legacy meta data may include a description of the document, parties involved, dates and the like.

In some embodiments, the Legacy Records 715 will be contained in a relational database. In some embodiments, the Legacy Records 715 are extracted from the relational database and parsed into multiple blocks that are entered into the Blockchain 701 as a Ledger Entries 702-704.

Each Leger Entry 702-704 is associated with a Hash pointer that points to a previous Ledger Entry 702-704 (Block). Each Ledger Entry 702-704 contains data that may be encrypted. In addition, a Hash pointer contains a Hash of data contained in the previous Ledger Entry 702-704. The Hash pointers provide a secure link between two blocks entered as Ledger Entries 702-704. A Ledger Entry 702-704 may also include a unique identifier (which may be coded), as described in more detail in connection with FIG. 8.

Onboarding of Legacy Records 715 via an Ingestion Controller 717 includes presentation of the Legacy Records 715 to the Ingestion Controller 717, the presentation may be accomplished via digital communication across a communications network 718, or via a storage medium, such as a storage disk, a solid state memory, tape of other device suitable for storage of digital data.

In general, the Ingestion Controller 717 receives the Legacy Records 715 and converts the Legacy Records 715 into formatted Legacy Records 715 which includes a format suitable for Blockchain entries. The Ingestion Controller 717 communicates formatted Legacy Records 715 to the Blockchain where the formatted Legacy Records 715 are stored as one or more Blockchain Entries 702-704.

In some embodiments, conversion of Legacy Records 715 associated with a Mortgage Loan includes parsing, or otherwise segmenting the Legacy Records 715 into logical portions that may each be entered into the Blockchain 701 as a Ledger Entry 702-704. Parsing may be according to one or more of: event; chronological order; segment size; event; mortgage Servicer; or other criteria. Each parsed segment of Legacy Record 715 is capable of being entered into the Blockchain and associated with a unique Hash and a unique Hash pointer. Some or all of the parsed segments are entered into the Blockchain 701 as Ledger Entries 702-704. A Hash pointer and a Hash may be associated with each Ledger Entry 702-704.

A Hash pointer is a data structure that is used to indicate where information is stored. The Hash pointer may be used to indicate where a parsed segment resides in the Blockchain 701. As discussed above, a Hash is an encrypted value of fixed length. In some embodiments, a first Block of ingested data may be used to create a genesis Block as a first Ledger Entry 702. Each subsequent Block entered as a Ledger Entry 703-704 will be associated with a new Hash that links to the Hash of the previous Ledger Entry 702-704. Each Block entered as a Leger Entry 702-704 may be traced back via the succession of Hashes to the genesis Block Ledger Entry 702. Some embodiments include Hashing that involves appending a Nonce to Hashed contents of a Block entered as a previous Ledger Entry 702-704 in the generation of a Hash.

Some embodiments may also include Legacy Records 715 associated with a Mortgage Loan that are treated as a single data unit. In such embodiments, the Legacy Records 715 associated with the Mortgage Loan are entered into the Blockchain as a single Ledger Entry 702-704 and associated with a single Hash and a single Hash Pointer. In such embodiments, a single Ledger Entry all includes omnibus Legacy Records ingested for a particular loan may be treated as a genesis Block or a first Ledger Entry 702 for that particular loan.

According to the present invention, a Blockchain 701 is therefore created that incorporates content from Legacy Records 715 for reference and contextual purposes. Accounting tracked on the Blockchain 701 may commence with a value or other terms entered into the Blockchain via the Legacy Records 715, but Blockchain verified accounting commences only with those transactions entered via Blocks as Ledger Entries 702-704.

In general, although Legacy Records 715 accurately reflect a state of a Loan as provided to the Blockchain, accounting verification benefits of Blockchain do not apply to events included in the Legacy Records 715 since Legacy Systems did not include the Blockchain platform and its associated benefits. However, once ingested to the Blockchain 701, some benefits are made available. Benefits that are made available with ingestion into the Blockchain may include ubiquitous transparency to users 707-710, such as a mortgage broker 707; a vendor 708 (such as a property appraiser); a Customer 709; an investor 710; and the like are not available via Legacy System 717 that previously housed and processed the Legacy Records 715.

Legacy Records 715 may be ingested in variously sized onboarding activities. For example, Legacy Records 715 pertaining to a single Mortgage Loan may be ingested, such as, for example, a Mortgage Loan originated by a mortgage broker that is passed over to the Blockchain system 700 for Mortgage Loan servicing tracking. In such cases, the Legacy Records 715 may not include even a single payment record, and accounting benefits associated with the Blockchain 701 will apply for the term of the Mortgage Loan, with the Legacy Records 715 including the parties to the Mortgage Loan transactions, terms of the Mortgage Loan and the like.

Other embodiments may include ingestion of Legacy Records 715 that include Legacy Records 715 relating to a volume of Mortgage Loans that includes tens, hundreds or more Mortgage Loans. Ingestion of Legacy Records 715 including a volume of Mortgage Loans will typically include records of past payments, a sequence of multiple Mortgage Loan Servicers, payment history, balance and related data that is not verified by the Blockchain 701. With the shift to Blockchain 701, legacy system users 711-714 that previously did not necessarily have transparency to events involving other legacy system users 711-714 may now be provided with transparency to all Mortgage Loan servicing events.

In another aspect, a system 700 of Blockchain ingestion will store some data in an Off-Blockchain database 705 such that access to confidential, sensitive or regulated data may be controlled, while one or more Ledger Entries 702-704 indicate that such Off Blockchain Data 705 exists. Typically, access to Off Blockchain Data 705 is controlled via metadata. In some embodiments, each access to the Off Blockchain Data 705 may be recorded on the Blockchain 701 as an event and memorialized as a Ledger Entry 702-704.

The present invention therefore provides historical Legacy Records 715 for visual purposes, but does not rely on Legacy Records for its own servicing event verification other than a transferred balance amount and some basic information fields, such as the mortgagor and Person responsible for repayment.

In some embodiments, Legacy Records 715 that have been processed by the Ingestion Controller 717 and entered into the Blockchain 701 as one or more Ledger Entries 702-704 is made available as historical records via a Blockchain interface 706 to one or more users, such as: a Broker 707; a Vendor 708 (such as an appraiser or a title company); a Mortgage Loan customer 709; and an investor 710. The same users may be granted access to view the mortgage servicing Blockchain 701 to view Ledger Entries 702-704, wherein the Ledger Entries generally commence after Legacy Records 715 have passed through the Ingestion Controller 717 and included in the Blockchain 701 as one or more Ledger Entries 702-704.

Still further, some embodiments may include portions of Legacy Records 715 that are stored as Off-Blockchain Data and accessible via the Blockchain 701. Storage of Legacy Records 715 as Off-Blockchain Data 705 allows for more efficient data management. Off-Blockchain Data may also include Loan Servicing Files.

In general, the present invention is functional to convert Legacy Records 715 from being stored in unwieldy and unverified relational database resources into a Blockchain 701 that is verified by its architecture and distributed ledgers. Once the Legacy Records 715 are entered as Ledger Entries 702-704, the Legacy Records 715 are protected by the Blockchain 701 from being manipulated or deleted going forward. In addition, the Blockchain 701 provides a human readable interface 706 for access to the Ledger Entries 702-704 and the Off-Blockchain Data 705 without the need to charge for through charges or other such click fees based upon a number of times a user 707-710 accesses the Ledger Entries 702-704 and the Off-Blockchain Data 705, thereby providing more efficient access to users 707-710 to mortgage servicing information and more certainty to budgeting of costs associated with the Mortgage Loan servicing.

Figure 8:
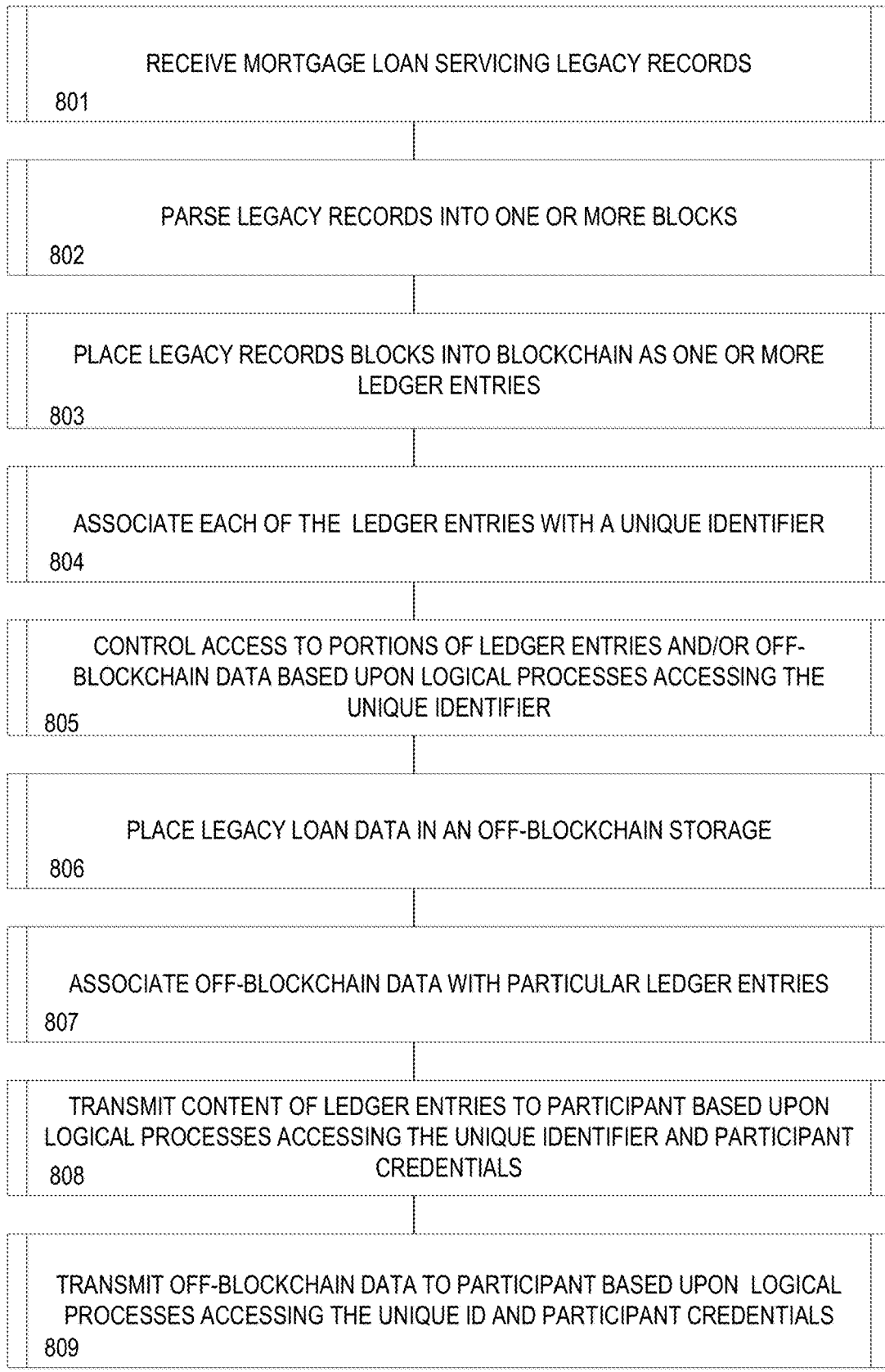
FIG. 8 illustrates additional method steps that may be used to implement the present invention.

Referring now to FIG. 8, method steps that may be implemented in some embodiments of the present invention are listed. At method step 801 a Blockchain Ingestion Controller may receive mortgage loan servicing legacy records. Receiving of the legacy records may be accomplished, for example, via an electronic communication of digital data, via a storage device such as a solid-state storage device, a disk drive, a magnetic tape or other medium for storage of digital data. The records may be for a single loan, such as in the case of a mortgage broker that initiates a loan and transfer it to the Blockchain system, or for a tranche of loans. For example, a first tranche may be received as a first file containing legacy records for 80 loans, and a second tranche may include a second file with legacy records for 50 loans. A tranche of legacy loan records may be organized according to a common trait. For example, a tranche may include a set of legacy records for loans in foreclosure, or a tranche may include a set of legacy records for jumbo mortgages, or other trait.

At method step 802, the received Legacy Records are parsed into one or more blocks, each block containing legacy records for a single loan. Parsing may be according to a predetermined criteria. For example, parsing into blocks may be made according to a chronological order of events, a timeframe of events, a transfer of mortgage servicer, or other discernable criteria. In some embodiments, all legacy records for a particular loan are included as a single block.

At method step 803, blocks of legacy records are placed onto the Blockchain. The blocks may be included as one or more Ledger Entries. For example, it is preferred for each Block to be entered as a new Ledger Entry.

At method step 804, each Ledger Entry is associated with a loan specific unique identifier. In some embodiments, the unique identifier may be stored in the blockchain entry metadata. The unique identifier and other metadata may include alphanumeric data that may be accessed for use in logical processes associated with the Blockchain and/or Off-Blockchain data. Each Ledger Entry may include an item represented as digital content and a unique identifier that associates the item with a particular loan. An item may include a wide variety of events, such as a mortgage loan payment, a phone call record, an email message, a change in a loan term, or other event. Metadata may describe the item. The unique identifier may be used to control access to the item and also to aggregate all pertinent information about a loan in response to an inquiry about the loan. For example, in some embodiments, most or all Participants may be credentialed with authorization to see that a Ledger Entry exists on the Blockchain, but only some Participants may be granted access to a particular item or associated Off-Blockchain data. Entries on the Blockchain may be associated with a particular loan via inclusion of the unique identifier in a Blockchain entry. Similarly, access to a Blockchain entry may be controlled via the unique identifier based upon a Participant's authorization to view documents associated with the loan.

In some embodiments, the unique identifier may be a multiple-character identifier comprising at least first, second, and third portions. In exemplary embodiments, this identifier may have 50 characters. The first portion may be a unique identifier identifying a type of transaction, vendor, or other identifier. For example, if the Ledger Entry corresponds to a payment on a mortgage, the first portion may be the letters PAY (for "payment"). The second portion may identify a particular vendor or payee. For example, the second portion may be BANK1234. The third portion may be generated randomly, cryptographically, etc. to create a unique identifier. For example, a 50-character identifier may be PAYBANK1234abcdefabcdefabcdefabcdefabcdefabcdefabc. In another embodiment, a fourth portion of the identifier identify a particular mortgage within a security. Thus, the first n characters of the unique identifier may succinctly identify (1) the type of transaction; (2) the type/identity of the vendor; (3) a random and unique number to identify the specific transaction; and (4) the particular mortgage associated with the transaction.

At method step 805, in some embodiments, logical processes may include controlling access to portions of the Blockchain based upon the metadata and/or controlling access to portions of the Off-Blockchain data based upon the metadata. For example, this control may be based upon a smart contract. A smart contract associated with a mortgage or a security may designate certain portions of the unique identifier established at step 804 to permit access to corresponding Ledger Entries on a Blockchain. For example, in a smart contract to purchase a security having ten mortgages, the smart contract may serve as middleware to allow the purchaser access to all Ledger Entries on the blockchain having unique identifiers associated with BANK1234 by interaction with a user interface. Similarly, BANK1234 may represent a subset of vendors who can have access to a given Ledger Entry.

At method step 806, data associated with Legacy Records may be placed in Off-Blockchain storage. Off Blockchain storage may include artifacts, such as documents, or related data. The Off-Blockchain storage is effective in limiting the size of the Blockchain.

At method step 807, portions of the Off-Blockchain data may be associated with one or more particular Blockchain Ledger Entries.

At method step 808 content of one or more Ledger Entries may be transmitted to a Participant based upon a request to make the transmission and logic the accesses the Participant's credentials and the metadata.

At method step 809, content included in the Off-Blockchain data may also be transmitted to a Participant based upon logic that accesses the Participant's credentials and the metadata.

Figure 9A:
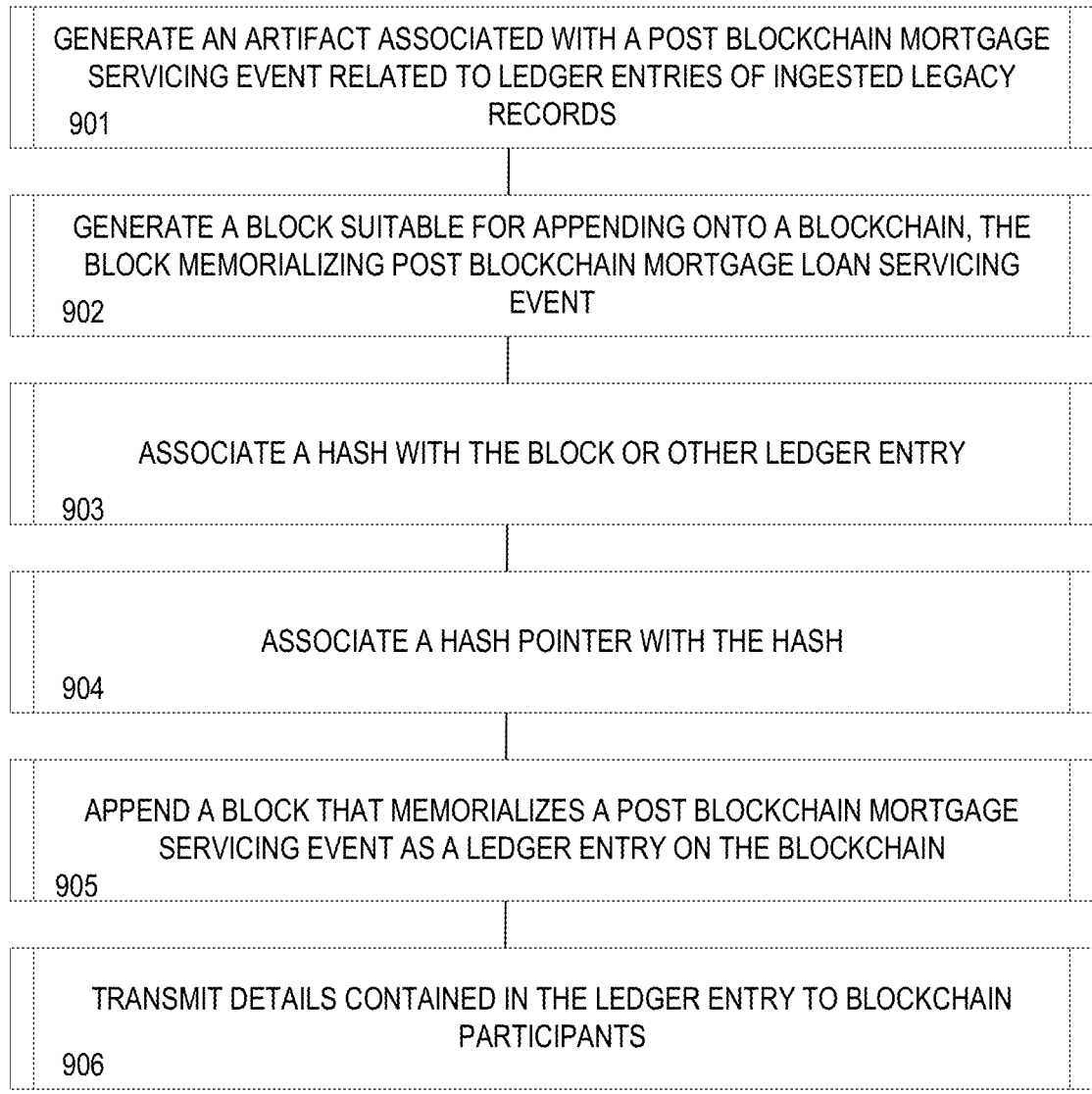

Referring now to FIGS. 9A and 9B, additional method steps that may be executed in practicing some embodiments of the present invention are illustrated. Beginning with FIG. 9A. at method step 901, an artifact is generated that is associated with a post-Blockchain mortgage servicing event. Post Blockchain events include events that occur at a point in time subsequent to ingestion of the Legacy Records into the Blockchain. The post-Blockchain mortgage servicing event is associated with the Ledger Entries containing Legacy Records of a same loan and Blockchain Blocks may be appended to the Blockchain as Ledger Entries for the loan. An identification of the loan may be accomplished via metadata linked to an associated Block. Post-Blockchain mortgage servicing Ledger Entries will have all of the advantages discussed herein relating to security and verification, while Ledger Entries of Legacy will contain values not verified by the Blockchain.

A post-Blockchain mortgage servicing event may include, by way of non-limiting example: a payment made against a loan balance; an audio recording of a conversation (such as a telephone call) related to a loan; a rate adjustment; a change in mortgage servicer; a change in an owner of the mortgage; a copy of a correspondence; a property appraisal; an insurance policy; an interest charge; an advance on a collateralized line of credit; a request for a loan payoff amount; a loan payoff; and almost any other exchange or interaction related to the servicing of a mortgage loan.

At method step 902, a Block suitable for entry onto a Blockchain is generated that memorializes the post Blockchain mortgage servicing event. Memorializing may include, one or more of: a copy of a correspondence, an image of a hardcopy document; a recording of a conversation; a transcription of a conversation; a log entry, such as a record of a meeting or a telephone call; a contact management or customer relationship management (CRM) software record; or other descriptor, scan, copy, or notation.

At step 903, a hash is associated with a Block (or other Leger Entry). The hash is an encrypted output of a fixed length. According to some implementations of the present invention, a hash a non invertible function, such that the hash may be used to map a set of inputs to a set of outputs (hash(s)->p), where variable "s" and variable "p" are both strings. For a string "s", application of the hash function, provides a new string "p". The Hash function is a deterministic procedure such that for any given input value "s", a same hash will produce a same output value ('p"). The Hash function is utilized in post Blockchain Ledger Entries to verify integrity of data in a Block contained in the Ledger Entry. Based upon the premise that a hash of the original Block will always map to a same value with the same hash function, a Participant is enabled to efficiently use a hash of a Block contained in a Ledger Entry and compare it with a published hash of the Block. If the Block has been adulterated or changed in (even a single bit) a value returned by the hash function also be changed.

At step 904, in some embodiments, a Hash Pointer may be associated with the Hash. The Hash Pointer will contain an address of a previous Block and the Hash of the data inside the previous Block.

At step 905, a Block that contains one or both of an artifact and information that memorializes a post Blockchain mortgage servicing event is appended onto the Blockchain as a Ledger Entry.

At step 906, details that are included in a Block included as a Ledger Entry are transmitted to one or more Blockchain Participants. Transmission may be based upon a Participants authorization to receive Ledger Entries associated with an associated Ledger Entry unique identifier. The transmission may be accomplished for example via a digital communications network, such and an Internet Protocol (IP) communications network.

Referring now to FIG. 9B, at step 907, an artifact that is associated with a post Blockchain mortgage loan servicing event is placed in an Off-Blockchain storage. Embodiments of Off-Blockchain storage include a server; a server farm, and IP accessed cloud storage.

At step 908 the artifact associated with a post Blockchain mortgage loan servicing event is associated with one or more Blocks appended to the Blockchain as Ledger Entries. An artifact may include, by way of non-limiting example, one or more of: may include, one or more of: a copy of a correspondence, an image of a hardcopy document; a recording of a conversation; a transcription of a conversation; a log entry, such as a record of a meeting or a telephone call; a contact management or customer relationship management (CRM) software record; or other descriptor, scan, copy, or notation.

At step 909, some or all of the contents of a Ledger Entry that includes a Block memorializing the post Blockchain mortgage servicing event is transmitted to a Participant. In some embodiments, the transmission may be predicated upon results of a logical process that accesses the Participant's credentials and metadata (including the unique identifier) associated with one or both of the Block and the Ledger Entry. In some embodiments, the Ledger Entry may be synonymous with a Block included in the Ledger Entry.

At step 910, an artifact memorializing the post Blockchain mortgage servicing event is retrieved and transmitted from the Off-Blockchain storage to a Participant. In some embodiments, the transmission may be predicated upon results of a logical process that accesses the Participant's credentials and metadata associated with one or both of the Block and the Ledger Entry.

At step 911, some embodiments may include a generation of a log the records access to one or both of the Blockchain and the Off-Blockchain storage.

At step 912, Ledger Entries appended to multiple Blockchain Nodes are reconciled. Typically, reconciliation is accomplished via a consensus mechanism. The consensus mechanism may be embodied in an automated process that is executed via programmable code running on a controller.

Mortgage Origination and Blockchain

Figure 10A:
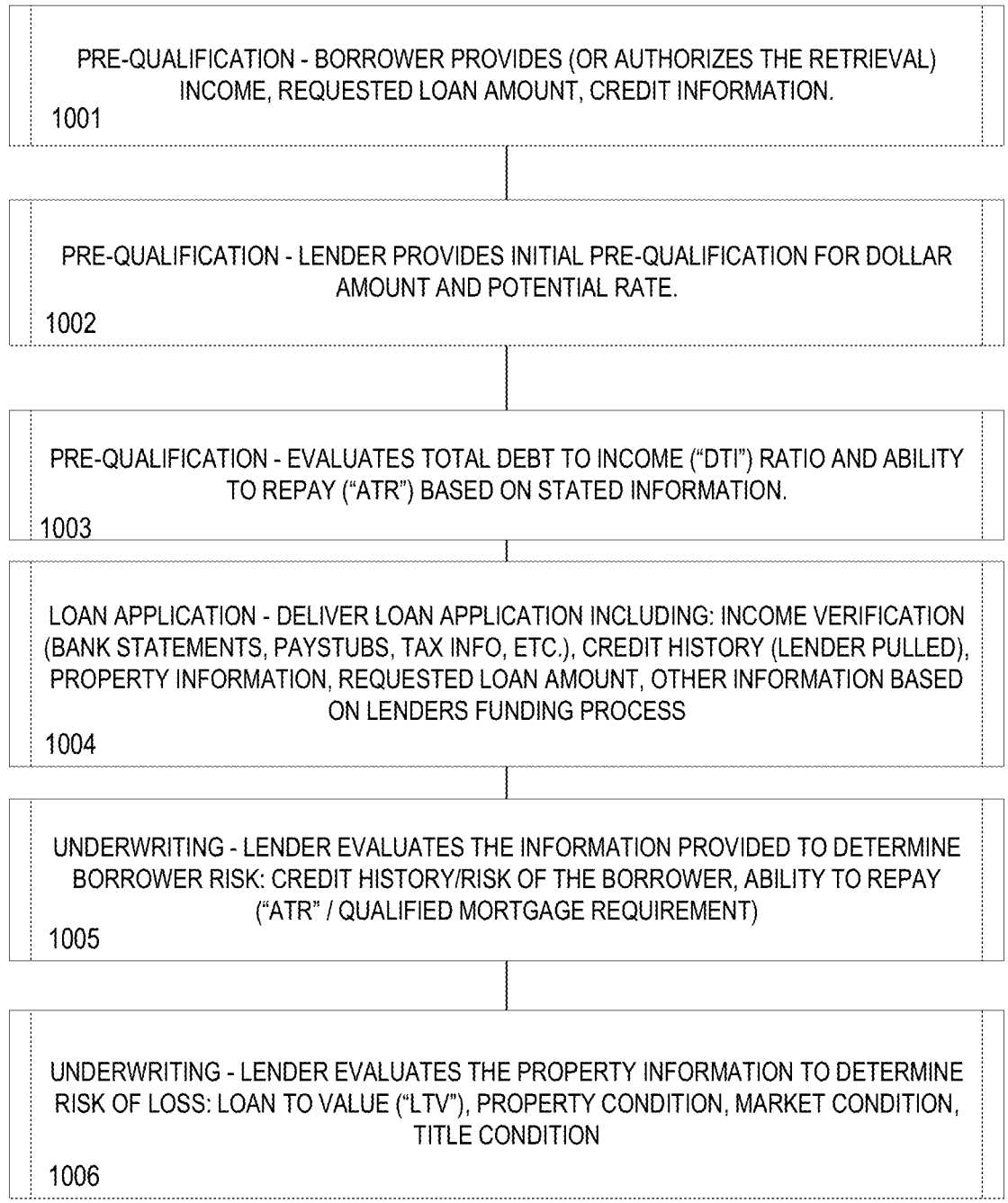

Referring to FIG. 10A an illustration of exemplary steps in mortgage origination is presented. In the initial steps a pre-qualification decision may be analyzed. At step 1001 of pre-qualification, a borrower may provide (or authorize the retrieval) income, requested loan amount, credit information. Proceeding to step 1002 of pre-qualification, a lender may provide initial pre-qualification information for dollar amount and potential rate. At step 1003 of pre-qualification, a lender may evaluate total debt to income ("DTI") ratio and ability to repay ("ATR") based on stated information.

Next a loan application process may be analyzed. Proceeding to step 1004 of loan application, a borrower may deliver a loan application including: income verification (bank statements, paystubs, tax info, etc.), and the lender may pull a credit history, property information, a requested loan amount, and other information based on lender's funding process.

The loan application process may now move to underwriting. At step 1005 of underwriting, a lender may evaluate the information provided to determine borrower risk from the perspective of credit history/risk of the borrower, and ability to repay ("ATR"/qualified mortgage requirement).

Continuing with underwriting at step 1006 of underwriting, a lender may evaluate the property information to determine the risk of loss: loan to value ("LTV"), property condition, market condition, and title condition as examples of parameters. FIG. 10B continues the exemplary processing flow with additional underwriting processing, at step 1007 where a lender may determine a final rate and amount of potential loan along with and points/discounts.

The processing may now shift to an acceptance of terms process. Proceeding to step 1008 of the acceptance of terms, a borrower may review the lender's offer, and either the borrower accepts, counters or the lending request ends. The process may proceed at step 1009 of the acceptance of terms, where either a final acceptance occurs, or lending requests ends.

Processing may shift to a closing/funding process. At step 1010 of a closing/funding process a lender may prepare loan docs (in adherence to Federal, State, and Local rules). Continuing at step 1011 of the closing funding process, the documents may be signed, verified and notarized. And, at step 1012 of the closing/funding process a determination that final conditions have been established/met may be made. Continuing to step 1013 of the closing/funding process funds may be requested and disbursed. At step 1014 of the closing/funding process the title may be recorded.

The processing may now shift to a takeout process. Proceeding to step 1015 a lender may carry out final action to move the loan to the balance sheet or the lender may sell the mortgage product to another entity.

Securitization of Loan/Mortgage Portfolios

Figure 10C:
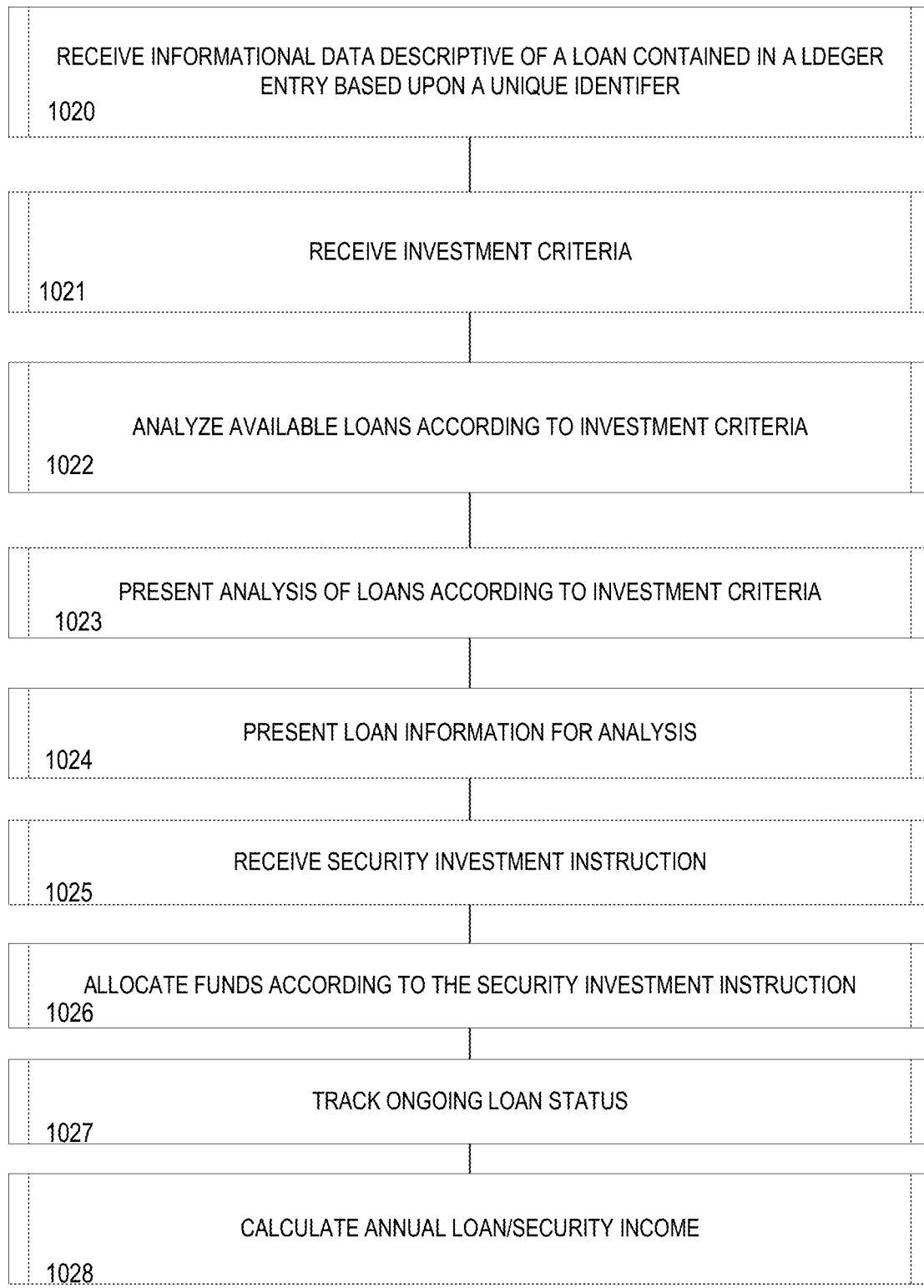

Referring to FIG. 10C, in some examples, loan/mortgage properties may be analyzed based on various parameters for packaging/inclusion into a portfolio of products associated by various common or uncommon aspects.

At step 1020 a financial user may receive informational data descriptive of a loan and contained in a Blockchain Ledger Entry based upon an association of the Ledger Entry with a particular unique identifier. Proceeding to step 1021, a financial user may determine or receive investment criteria. Investment criteria may include, without limitation, an amount associated with an investment (e.g., a return on investment for a security), a zip code associated with an investment, a time horizon associated with an investment, an investment type, an originator of a loan associated with the investment, or other criteria descriptive of an investment or desirable for a potential investor to know prior to or concurrently with making an investment.

At step 1022, the financial user may analyze available loans according to the investment criteria.

At step 1023, the financial user may create analysis of loans according to investment criteria.

At step 1024, the financial user may present loan information for further analysis. At step 1025, a financial user may receive security investment instruction.

At step 1026, funds may be allocated according to the security investment instruction. At step 1027, a process may be performed to track ongoing loan status.

At step 1028, a calculation may be made of an annual loan/security income.

Figure 10D:
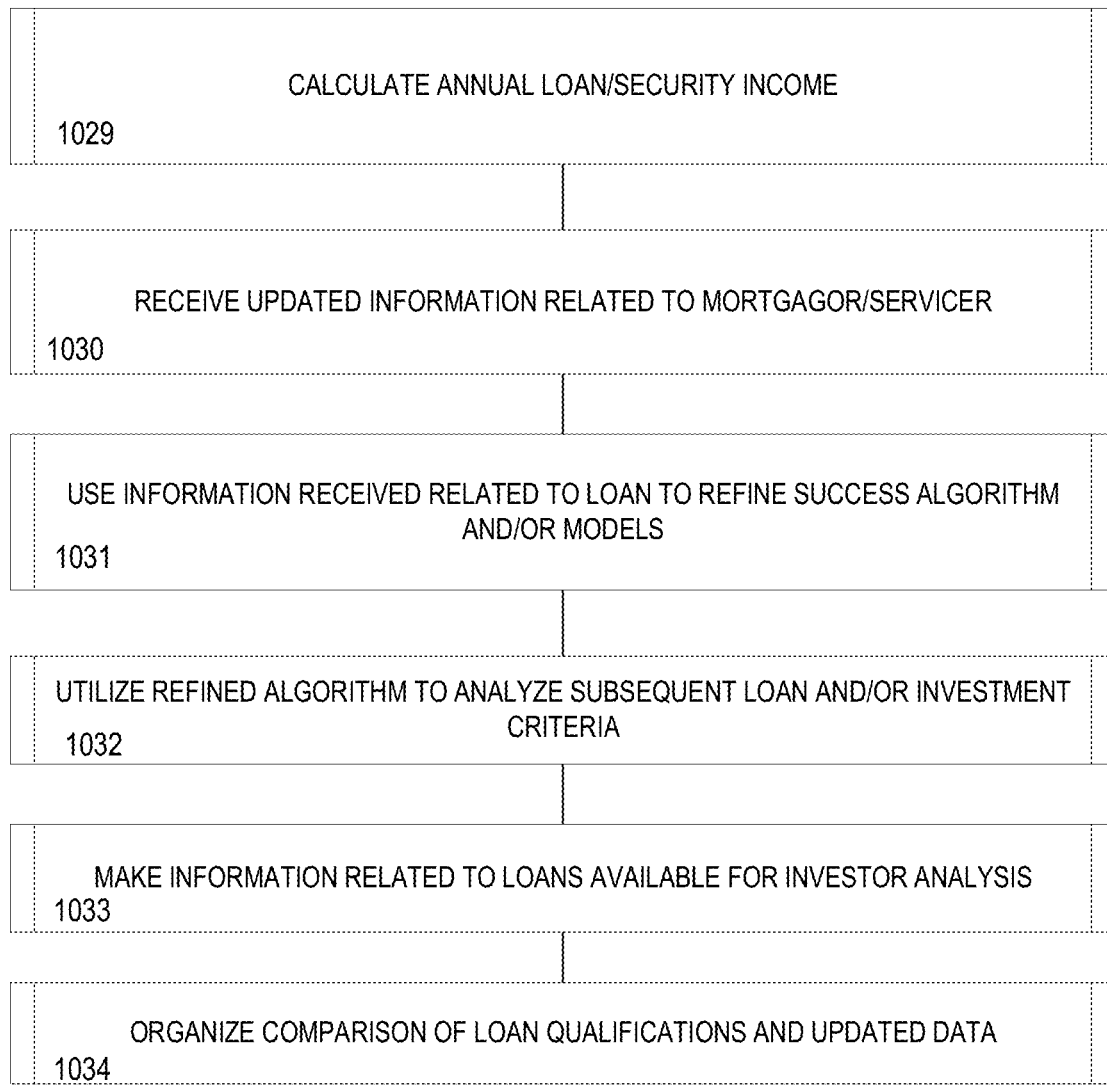

The process may continue in reference to FIG. 10D. At step 1029, a calculation may be made of an annual loan/security income. Continuing to step 1030, a financial user may receive updated information related to a mortgagor/servicer.

At step 1031, a financial user may utilize information received related to loan to refine success algorithm and/or models. At step 1032, the refined algorithm may be utilized to analyze subsequent loan and/or investment criteria. Proceeding to step 1033, a financial user may make information related to loans available for investor analysis. And, at step 1034, the financial user may organize comparison of loan qualifications and make analysis of updated data.

Figure 10E:
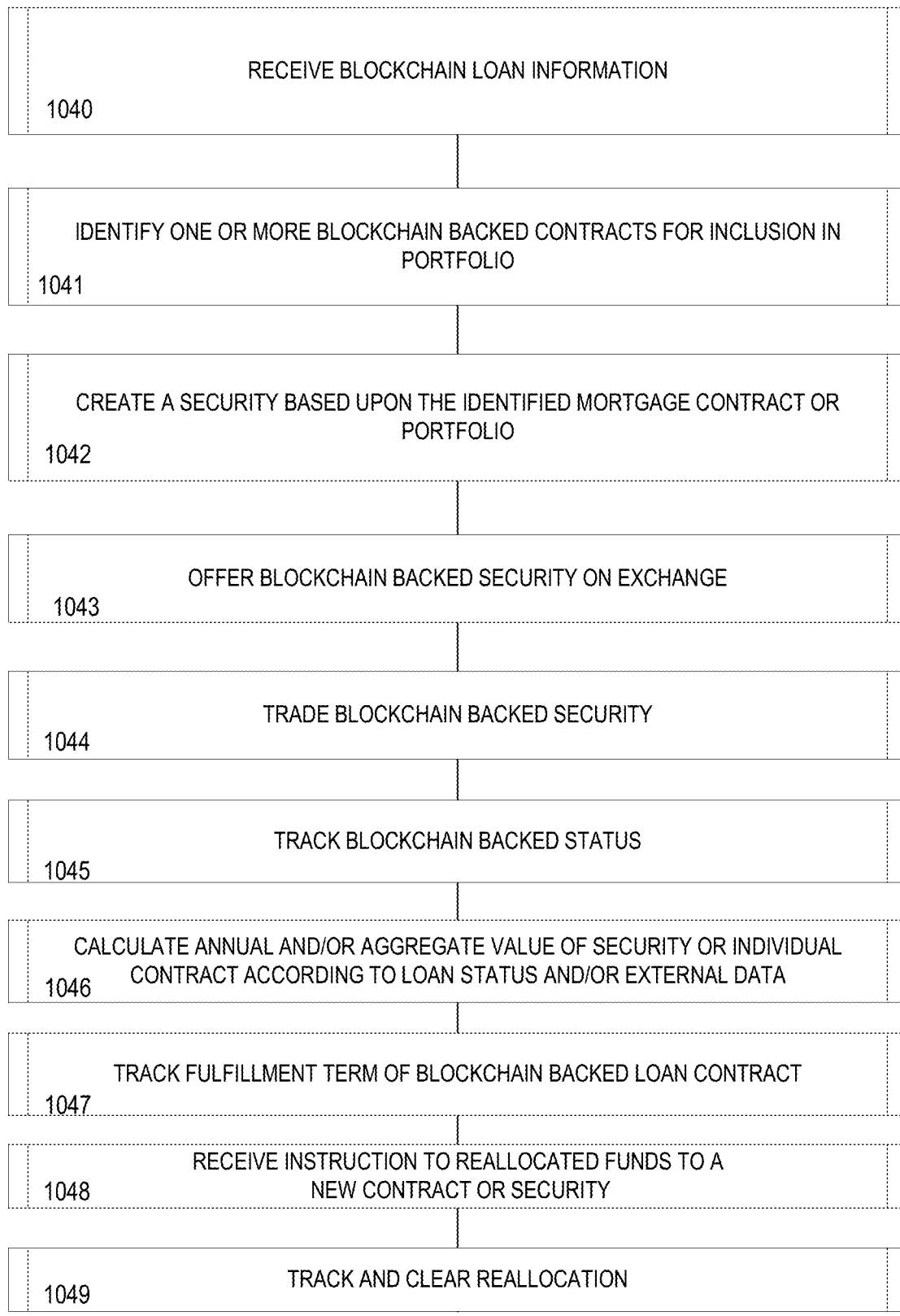

Referring now to FIG. 10E, an exemplary block chain process related to these various processing steps is illustrated. At step 1040, a financial user may receive blockchain loan information.

At step 1041, a financial user may identify one or more blockchain backed contracts for inclusion in a portfolio. In some examples, the financial user may be a person or a group of people, in other examples automated devices may act as a financial user. At step 1042, a financial user may create a security based upon the identified mortgage contract or portfolio.

At step 1043, a financial entity may offer a blockchain backed security on an exchange. At step 1044, financial entities may trade the blockchain backed security. At step 1045, a financial user may track the status of a blockchain backed security. The ability of the user to track the status may depend upon the user's permissions. For example, certain users may be able to see ledger entries associated with the blockchain only for certain unique identifiers. In some embodiments, these unique identifiers may be encoded (for example, as described in connection with FIG. 8), and a user may be able to view only ledger entries having unique identifiers with certain characteristics. For example, payment vendors may be able to see ledger entries having a unique identifier beginning with PAY. In another example, certain classes of investors may be able to see all transactions having a unique identifier ending in a zero.

At step 1046, a financial user may calculate annual and/or aggregate value of the blockchain backed security or individual contract according to the loan status which may be supplemented or based upon external data.

At step 1047, a financial user may track fulfillment of a term of the blockchain backed loan contract. This may also be done according to the access protocols discussed at step 1045.

At step 1048, a financial user may receive instruction to reallocate funds to a new contract or a new security. At step 1049, the reallocation may be tracked and cleared by a financial user.

Creation of Blockchain-Backed Loan Based Securities

Figure 11:
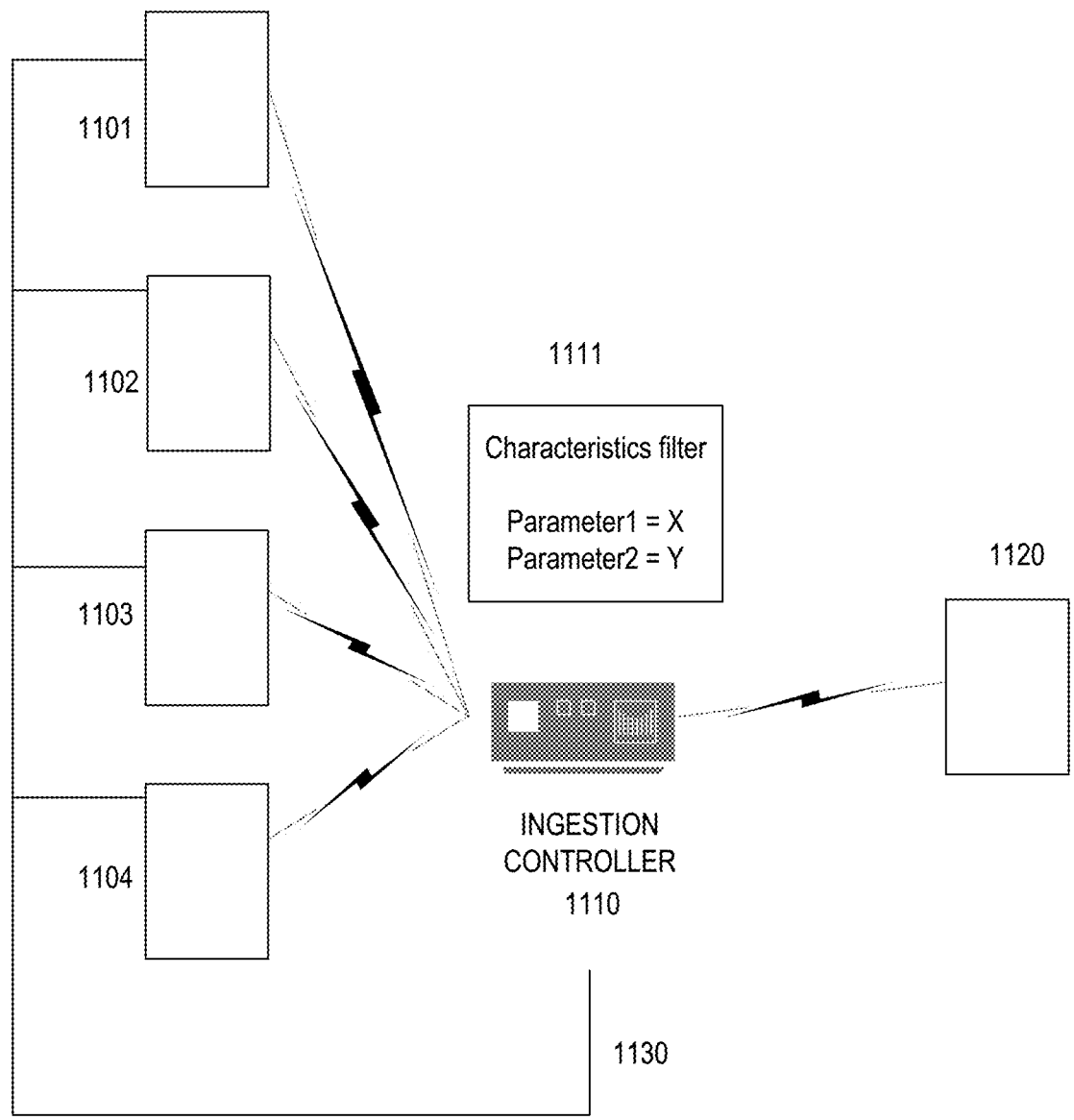
FIG. 11 illustrates an exemplary process of forming a blockchain based security from selected mortgage products of a collection of mortgage tracking blockchains.

Referring to FIG. 11, a generic methodology for the creation of a collection of loan products into a security asset is illustrated. As a starting point, a number of "input" blockchains 1101, 1102, 1103, and 1104 formed around loan/mortgage tracking/database may be linked by access to a security forming engine 1100. In this example, an arbitrary number of source data blockchains (that is four) is used for illustration, though fewer and more blockchains may be within the scope of examples. The "input" blockchains may be of arbitrary size. There may be a common linkage related to the types of blockchains that are selected, such as for example, each blockchain comprising a dataset of a similar but distinct bank. Other categories such as an accumulation of regional banks in each blockchain, or a fund of loan or mortgage back assets in each or one blockchain may exists. In fact, any entity that is tracked in a blockchain where critical data associated with loan/mortgage assets are the basis of the blockchain may be employed.

In some examples, the blockchains used as input 1101-1104 may be dynamically updated while analysis is being performed. In other examples, a "locked" blockchain representing a state of a source blockchain at a reference time may be utilized. It may be assumed that regardless of the exact type of blockchain used as input, that overhead blockchain related integrity processing would be performed.

The security forming engine 1110 may have the characteristics of a data processing engine which has been authorized to access data by the input blockchains. This may be used to characterize the contained individual assets in each blockchain, to perform audits on the integrity of characteristic data of the blockchain, to reassess aspects of the individual assets such as return on investment assessments, risk assessments and the like.

Through the access that has been granted to the security forming engine 1110, which may be viewed as a form of ingestion controller, the various assets of the different blocks 1101-1104 may be analyzed and assessed against specific parametric tests 1111 to match specific characteristics of the asset against inputted parameters. Assets that match a parametric characteristic or range of characteristics may be flagged by the security forming engine, and a security blockchain 1120 may be loaded up with data related to each of the matching assets. In some examples, a feedback record relating to matched assets may be fed back to the input blockchains to record the action of the security forming engine 1111.

A ramification of the action of the security forming engine may involve the creation of a proposed set of assets that could be acquired and pooled into a security. This proposed set of assets may be presented as a report by the security forming engine to users who may authorize or deauthorize trades on the selected and proposed assets for the security. The various assessment steps may be tracked as entries in the newly formed security asset blockchain 1120. In other examples, the security forming engine may have the authorization to trade on its security asset blockchain analysis autonomously.

Figure 12:
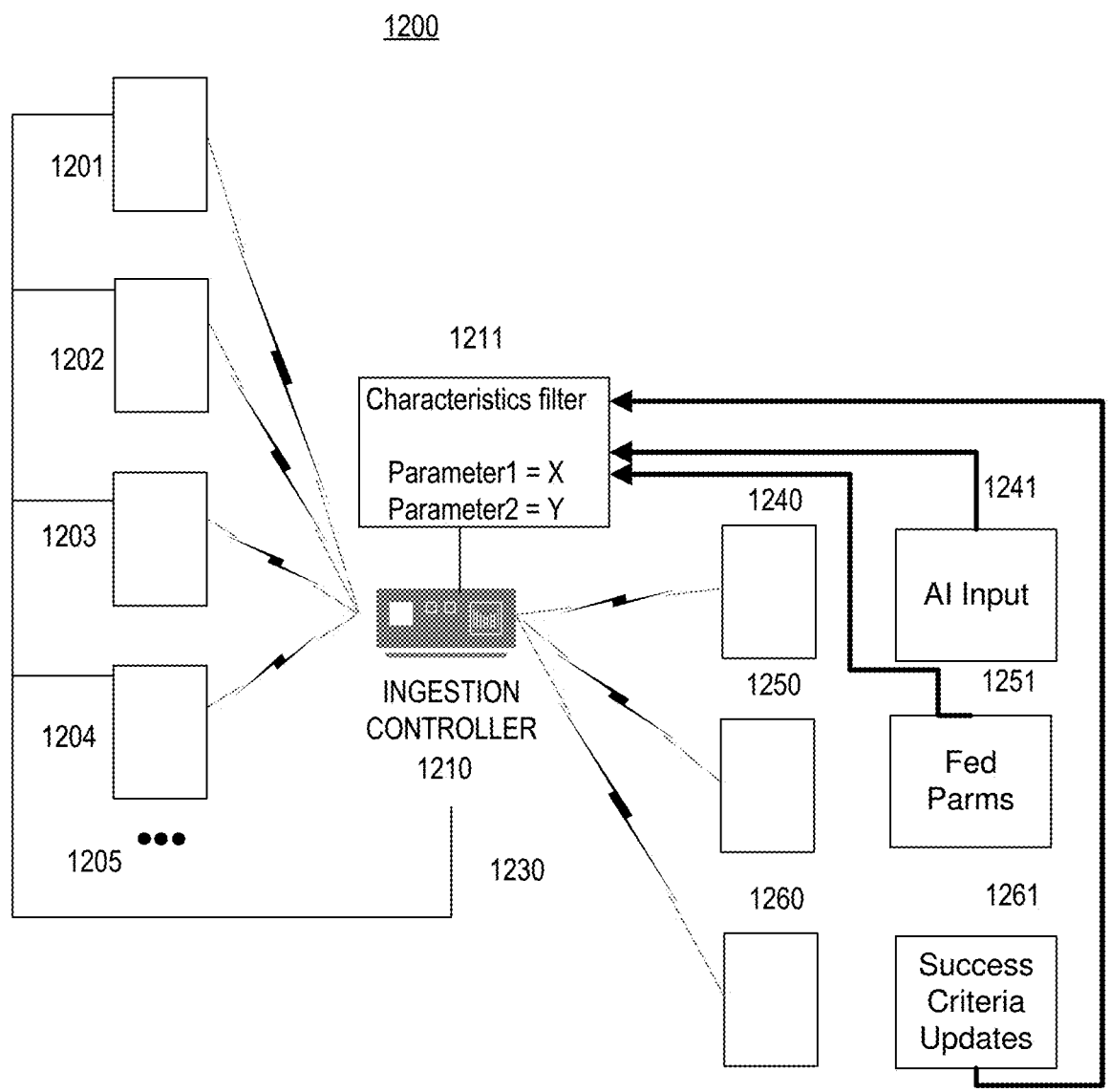
FIG. 12 illustrates an alternative view of a security forming engine for forming a security using one or more blockchains.

Proceeding to FIG. 12, a different view of the security forming engine is illustrated. Input blockchains 1201-1204 which may include an arbitrary additional number of input blockchains 1205 may be utilized as input to the security forming engine 1210, also a type of ingestion controller.

Also illustrated in FIG. 12 is the aspect that the parametric input 1211 to the security forming engine 1120 may be established and maintained by different input sources. As an example, an artificial intelligence controller 1241 may provide parameters for the parametric input 1211. The artificial intelligence controller may operate by viewing trends in the performance aspects of the various loan/mortgage process or it may have a wider analysis scope where it evaluates an open degree of macroeconomic/microeconomic data from outside sources which it then uses to determine a calculated set of parameters for the parametric input 1211. Regardless of the nature of the AI based parameter input, a particular securitized loan/mortgage asset blockchain 1240 based on AI operation may result.

In other examples, a set of parameters may be loaded by analysts into a selection engine 1251 to provide the parametric input 1211 to the security forming engine 1210. For example, analysts may be interested in individual parameters or combination of parameters of characteristics such as geographic location, occupation of mortgagee, length of time a mortgagee is employed, the nature of the employer of the mortgagee, the tax payer filing status of the mortgagee, the presence of particular financial attributes such as the mortgagee having a 401K, having other loans, their use of credit and the like. It may be important that the source of the data that is used to perform these characterizations ultimately comes from blockchains where the integrity of the fundamental data is verified by the blockchain process.

Example 1

As a first non-limiting example, a security may comprise 1000 mortgages. These mortgages may be represented by the blockchains described herein. As discussed in FIG. 8, each blockchain may be comprised of multiple Ledger Entries having respective coded unique identifiers. The security may be chosen according to parameters associated with one or more of the mortgages. For example, the security may be chosen as a collection of mortgages within a zip code range. Investors in the security may have access to one or more Ledger Entries in each blockchain associated with the mortgage. For example, to monitor payment status, investors may have access to all unique identifiers beginning with PAY. Moreover, the level of access may change depending upon a fractional amount of the security owned by the investor.

Example 2

As a second non-limiting example, a security may comprise 1000 derivatives. Information about the derivatives may also be contained within blockchains that are input into one of the engines described above to create the security. Certain derivatives, such as over-the-counter derivatives, may be particularly suitable for deployment within the blockchain system described herein. For example, if the derivatives in a security related to a large quantity of swaps, then these could be coded as smart contracts. Each smart contract may be associated with a coded unique identifier, as described herein, to distinctly and intentionally allocate access to one or more classes of investors. Upon the occurrence of certain events (e.g., a time certain, in a swap contract), the smart contract could be operative to swap assets between parties to the derivatives. This swap could also be recorded as a Ledger Entry with its own corresponding coded unique identifier.

Example 3

As a third non-limiting example, a security may comprise 1000 mortgages that are categorized as jumbo, high-risk mortgages. One or more collection vendors may be authorized to view the blockchain including these mortgages upon the occurrence of a certain event (e.g., a foreclosure). Upon the occurrence of that event, a portion of the coded unique identifier associated with a given mortgage may be released to the vendors. Additional information within the coded unique identifier may further narrow the vendor; for example, the blockchain may include protocol allowing Vendor A to access only unique identifiers ending in 1 or 2; Vendor B to access only unique identifiers ending in 2 or 3; Vendor C to access only unique identifiers ending in 4 or 5 (i.e., there may or may not be some overlap in which vendors are allowed to access which agreements).

CONCLUSION

A number of embodiments of the present disclosure have been described. While this specification contains many specific implementation details, there should not be construed as limitations on the scope of any disclosures or of what may be claimed, but rather as descriptions of features specific to particular embodiments of the present disclosure.

While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the form disclosed, but to the contrary, the present disclosure is to cover all modification, equivalents and alternatives falling within the spirit and scope of embodiments of the present disclosure as defined by the appended claims.

The headings used herein are for organizational purposes only and are not meant to be used to limit the scope of the description or the claims. As used throughout this application, the word "may" be used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

Certain features that are described in this specification in the context of separate embodiments can also be implemented in combination in a single embodiment. Conversely, various features that are described in the context of a single embodiment can also be implemented in combination in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while method steps may be depicted in the drawings in a particular order, this should not be understood as requiring that such operations be performed in the particular order shown or in a sequential order, or that all illustrated operations be performed, to achieve desirable results.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

In certain implementations, multitasking and parallel processing may be advantageous. Nevertheless, it will be understood that various modifications may be made without departing from the spirit and scope of the claimed disclosure.

The invention claimed is:

1. A method of aggregating mortgage loans based upon servicing records verified via a blockchain distributed ledger, the method comprising the steps of:

receiving mortgage loan servicing legacy records into an ingestion controller, each mortgage loan servicing legacy record associated with one of multiple respective mortgage loans that have been instantiated via a smart contract with multiple actions performed at disparate locations thereby leading to creation of an electronic file, wherein the electronic file is representative of a hardcopy file store in an off-blockchain storage;

recording in the electronic file, respective times of the multiple actions and person performing the multiple actions;

associating a blockchain specific unique identifier to one of the mortgage loan servicing records;

parsing the mortgage loan servicing record associated with the blockchain specific unique identifier into multiple blocks, each of the multiple blocks suitable for entry onto the blockchain distributed ledger as a respective ledger entry;

associating each ledger entry, via operation of the ingestion controller, the blockchain specific unique identifier;

storing the respective ledger entries onto the blockchain distributed ledger;

generating a hash value for the blockchain distributed ledger referencing a nonce;

associating a hash pointer with the hash value;

allowing read access to the hash value to a participant to achieve a nonrepudiation trait for a specific ledger entry, wherein the participant comprising at least one of: a borrower, an investor, a vendor, and a servicer of a loan associated with the mortgage loan servicing record;

granting the read access, by the ingestion controller, to the participant which further includes portions of the specific ledger entries based upon the blockchain specific unique identifier;

recording, in a block on the blockchain distributed ledger, (1) a physical location of the hardcopy file comprising a location of a building containing the hardcopy file and (2) an authentication, by a uniquely identified mobile smart device of a property appraiser, of the hardcopy file stored at the physical location and a visual inspection of a physical property associated with the mortgage loan servicing record associated with the blockchain specific unique identifier;

transmitting content of the specific ledger entries to the participant based upon the granted read access and a credential, wherein the credential comprises a private key that may be used as a mechanism to permit access to the portions of the specific ledger entries of the blockchain distributed ledger protected by access rights;

querying the specific ledger entries with an aggregation criteria for a collection of loan products, wherein the aggregation criteria comprises at least one of: an amount associated with an investment, a zip code associated with the investment, a time horizon associated with the investment, an investment type, an originator of a loan associated with the investment;

creating, by the ingestion controller, a security asset to include the collection of loan products based on the aggregation criteria;

executing a smart contract transferring ownership of the security asset from a first investor to a second investor;

transferring the credential from the first investor to the second investor to provide the second investor with the granted read access to blocks corresponding to the portions of the specific ledger entries; and transmitting to the second investor the security asset including the collection of loan products and the block on the blockchain distributed ledger memorializing a property appraisal corresponding to the visual inspection of the physical property.

2. The method of claim 1, wherein the visual inspection of the physical property comprises a name of the property appraiser who conducted the inspection and reviewed its results.

3. The method of claim 2 additionally comprising the step of: generating read permissions for the inspection of the physical property additionally for the borrower and the servicer of the loan involved with the physical property.

4. The method of claim 3 additionally comprising the step of: generating a new hash value following recordation of the property appraisal, notifying the participant of the new hash value, a previous hash value and nonce associated with the new hash value.

5. The method of claim 4 comprising the step of: allowing all participants to a blockchain on which the blockchain distributed ledger is distributed to have read access to datum linking blocks on the blockchain.

6. The method of claim 1, the method additionally comprising the step of:

revoking the credential for the granted read access of the first investor after ownership is transferred.

7. The method of claim 3 additionally comprising the step of: generating a second electronic artifact associated with a post blockchain mortgage servicing event, the second electronic artifact related to a loan associated with a specific ledger entry for which content is transmitted to the second investor.

8. The method of claim 1 additionally comprising the step of: generating a second block suitable for appending onto the blockchain distributed ledger, contents of the second block memorializing a post blockchain mortgage loan servicing event.

9. The method of claim 1 additionally comprising the step of: appending a second block memorializing a post blockchain mortgage loan servicing event to the blockchain distributed ledger as a new ledger entry.

10. The method of claim 9 additionally comprising the step of: transmitting details contained in the new ledger entry to the second investor.

11. The method of claim 10 additionally comprising the step of: storing a post blockchain electronic artifact in the off-blockchain storage.

12. The method of claim 11 additionally comprising the step of: associating the post blockchain electronic artifact with the second block appended to the blockchain distributed ledger.

13. The method of claim 12 additionally comprising the step of:

transmitting the post blockchain electronic artifact and stored in the off-blockchain storage to the second investor based upon accessing metadata and the credential of the second investor.

14. The method of claim 13 additionally comprising the step of: generating a log recording participant access to the blockchain distributed ledger.

15. The method of claim 13 additionally comprising the step of: generating a log recording participant access to the off-blockchain storage.

16. The method of claim 13 additionally comprising the step of: reconciling ledger entries appended to the blockchain distributed ledger.

17. The method of claim 16, wherein the step of reconciling the ledger entries is accomplished via a consensus mechanism across a plurality of blockchain nodes operated by a plurality of the participants.

18. The method of claim 9 additionally comprising the step of: initiating a new block on the blockchain, the new block comprising a new action stored in a vendor format.

19. The method of claim 18, wherein the vendor format comprises a proprietary encryption technique that may occur outside of the blockchain.

20. The method of claim 9 additionally comprising the step of: initiating a new block on the blockchain, the new block comprising a new action received in a vendor format and converted to a servicer format.

\* \* \* \* \*